(12) United States Patent
Shin et al.

(10) Patent No.: US 12,457,057 B2
(45) Date of Patent: Oct. 28, 2025

(54) METHOD AND DEVICE FOR PERFORMING RETRANSMISSION IN WIRELESS COMMUNICATION SYSTEM

(71) Applicant: LG ELECTRONICS INC., Seoul (KR)

(72) Inventors: Jongwoong Shin, Seoul (KR); Bonghoe Kim, Seoul (KR); Sung Ryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 18/034,211

(22) PCT Filed: Apr. 12, 2021

(86) PCT No.: PCT/KR2021/004585
§ 371 (c)(1),
(2) Date: Apr. 27, 2023

(87) PCT Pub. No.: WO2022/097850
PCT Pub. Date: May 12, 2022

(65) Prior Publication Data
US 2023/0396362 A1    Dec. 7, 2023

(30) Foreign Application Priority Data
Nov. 6, 2020    (KR) .......................... 10-2020-0148030

(51) Int. Cl.
*H04L 1/08*    (2006.01)
*H04L 1/00*    (2006.01)
*H04L 1/1812*    (2023.01)

(52) U.S. Cl.
CPC .............. *H04L 1/0063* (2013.01); *H04L 1/08* (2013.01); *H04L 1/1812* (2013.01)

(58) Field of Classification Search
CPC .......... H04W 4/40; H04W 72/40; H04W 4/46
See application file for complete search history.

(56) References Cited

U.S. PATENT DOCUMENTS

2021/0306981 A1\*    9/2021    Liu ...................... H04L 1/1896

FOREIGN PATENT DOCUMENTS

| CN | 101765993 A | \* | 6/2010 | .......... H04L 1/1614 |
| KR | 1020190130857 | | 11/2019 | |
| KR | 1020200112668 | | 10/2020 | |

OTHER PUBLICATIONS

Qualcomm Incorporated, "Erasure coding and HARQ design," 3GPP TSG-RAN WG1 #86bis, R1-1610143, Oct. 2016, 9 pages.
(Continued)

*Primary Examiner* — Tu X Nguyen
(74) *Attorney, Agent, or Firm* — LEE, HONG, DEGERMAN, KANG & WAIMEY

(57) ABSTRACT

The present disclosure is for performing retransmission in a wireless communication system, and a method by which a first device operates in a wireless communication system comprises the steps of: receiving, from a second device, a first signal comprising outer- and inner-coded data; detecting information-bit-based first-type inner code blocks and parity-bit-based second-type inner code blocks by inner decoding the data in correspondence to the inner coding; confirming the location and the number of at least one bit with a possibility of error, among outer block codes, on the basis of the location of inner code blocks for which decoding has failed; deciding to request retransmission on the basis of the location and the number of the at least one bit; and requesting, to the second device, on the basis of the location and the number of the at least one bit, retransmission of at least one of an information portion or a parity portion of outer code blocks.

20 Claims, 31 Drawing Sheets

(56) References Cited

OTHER PUBLICATIONS

ZTE, "Consideration on outer code for NR," 3GPP TSG-RAN WG1 #89, R1-1707185, May 2017, 11 pages.
Qualcomm Incorporated, "UCI considerations for CBG-based (re)-Transmissions," 3GPP TSG-RAN WG1 #90, R1-1713447, Aug. 2017, 6 pages.
PCT International Application No. PCT/KR2021/004585, International Search Report dated Aug. 4, 2021, 4 pages.

* cited by examiner

METHOD AND DEVICE FOR PERFORMING RETRANSMISSION IN WIRELESS COMMUNICATION SYSTEM

CROSS-REFERENCE TO RELATED APPLICATION(S)

This application is the National Stage filing under 35 U.S.C. 371 of International Application No. PCT/KR2021/004585, filed on Apr. 12, 2021, which claims the benefit of earlier filing date and right of priority to Korean Application No. 10-2020-0148030, filed on Nov. 6, 2020, the contents of which are all incorporated by reference herein in their entirety.

TECHNICAL FIELD

The following description relates to a wireless communication system, and relates to a method and device for performing channel retransmission in a wireless communication system.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure relates to a method and device for more effectively performing retransmission in a wireless communication system.

The present disclosure relates to a method and device for effectively performing retransmission in an environment in which outer encoding and outer decoding are performed in a wireless communication system.

The present disclosure relates to a method and device for determining whether to perform retransmission using only a result of inner decoding without outer decoding in a wireless communication system.

The present disclosure relates to a method and device for selecting a target of retransmission based on a result of inner decoding without outer decoding in a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method by performed a first device in the wireless communication system may comprise receiving a first signal comprising outer-coded and inner-coded data from a second device, detecting information bit-based first type inner code blocks and parity bit-based second type inner code blocks by performing inner decoding corresponding to inner coding on the data, identifying a location and number of at least one bit having a possibility of an error in outer block codes based on locations of inner code blocks where decoding has failed, determining whether to request retransmission based on the number of at least one bit, and requesting, to the second device, retransmission of at least one of an information part or a parity part of the outer code blocks based on the location and number of at least one bit.

As an example of the present disclosure, a method by performed a second device in a wireless communication system may comprises transmitting a signal comprising outer-coded and inner-coded data to a first device and receiving a feedback signal requesting retransmission of at least one of an information part or a parity part of outer code blocks generated by outer coding. A target of the retransmission may be determined based on a location and number of at least one bit having a possibility of an error in outer block codes identified based on locations of inner code blocks where inner decoding corresponding to the inner coding has failed on the data in the first device.

As an example of the present disclosure, a first device in a wireless communication system may comprise a transceiver and a processor coupled to the transceiver. The processor may receive a first signal comprising outer-coded and inner-coded data from a second device, detect information bit-based first type inner code blocks and parity bit-based second type inner code blocks by performing inner decoding corresponding to inner coding on the data, identify a location and number of at least one bit having a possibility of an error in outer block codes based on locations of inner code blocks where decoding has failed, determine whether to request retransmission based on the number of at least one bit, and request, to the second device, retransmission of at least one of an information part or a parity part of the outer code blocks based on the location and number of at least one bit.

As an example of the present disclosure, a method by performed a second device in a wireless communication system may comprise transmitting a signal comprising outer-coded and inner-coded data to a first device and receiving a feedback signal requesting retransmission of at least one of an information part or a parity part of outer code blocks generated by outer coding. A target of the retransmission may be determined based on a location and number of at least one bit having a possibility of an error in outer block codes identified based on locations of inner code blocks where inner decoding corresponding to the inner coding has failed on the data in the first device.

As an example of the present disclosure, a first device may comprise at least one memory and at least one processor functionally connected to the at least one memory. The at least one processor may control the first device to receive a first signal comprising outer-coded and inner-coded data from a second device, to detect information bit-based first type inner code blocks and parity bit-based second type inner code blocks by performing inner decoding corresponding to inner coding on the data, to identify a location and number of at least one bit having a possibility of an error in outer block codes based on locations of inner code blocks where decoding has failed, to determine whether to request retransmission based on the number of at least one bit, and to request, to the second device, retransmission of at least one of an information part or a parity part of the outer code blocks based on the location and number of at least one bit.

As an example of the present disclosure, a non-transitory computer-readable medium storing at least one instruction may comprise the at least one instruction. The at least one instruction may control a first device to receive a first signal comprising outer-coded and inner-coded data from a second device, to detect information bit-based first type inner code blocks and parity bit-based second type inner code blocks by performing inner decoding corresponding to inner coding on the data, to identify a location and number of at least one bit having a possibility of an error in outer block codes based on locations of inner code blocks where decoding has failed, to determine whether to request retransmission based on the number of at least one bit and to request, to the second device, retransmission of at least one of an information part or a parity part of the outer code blocks based on the location and number of at least one bit.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

As is apparent from the above description, the embodiments of the present disclosure have the following effects.

According to the present disclosure, at error rate at a transport block level may be lowered, and resource and latency gain may be improved.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

DETAILED DESCRIPTION

Figure 1:
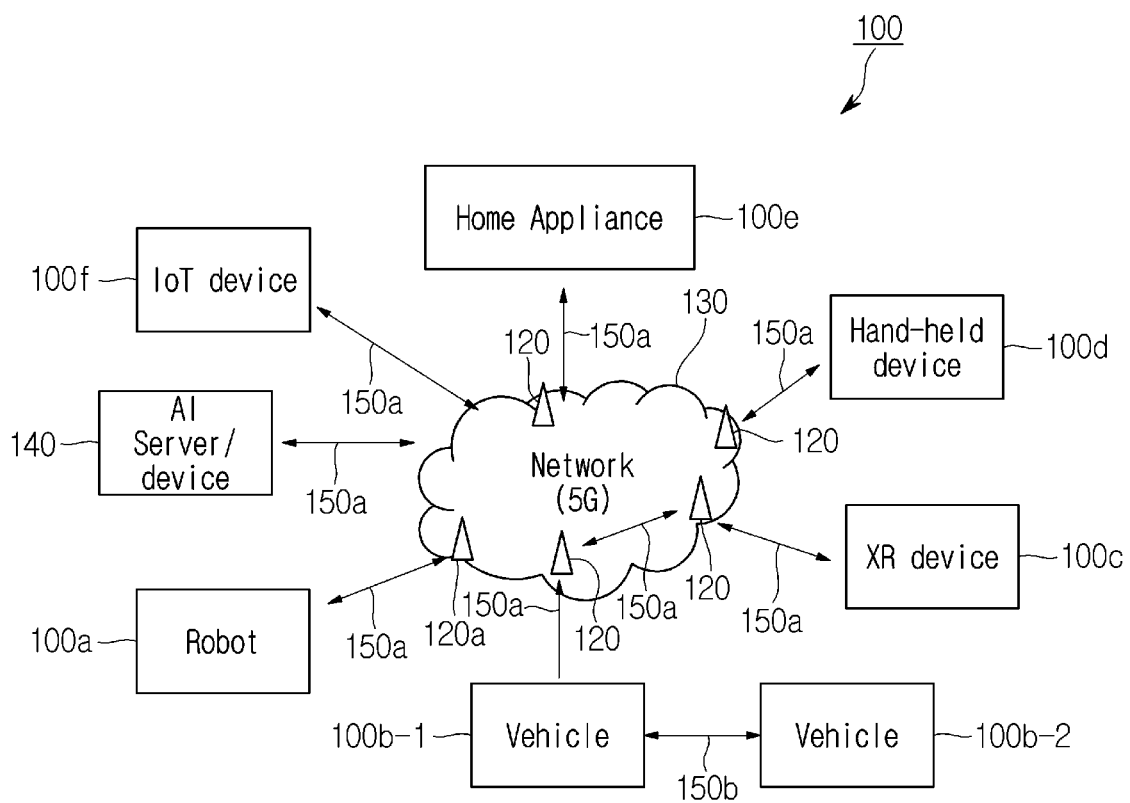
FIG. 1 is a view showing an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, 3GPP $5^{th}$ generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 is a view showing an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5GNR or LTE) and may be referred to as a communication/wireless/5G device. Without being limited thereto, the wireless device may include a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120 and the network 130 may be implemented by a wireless device, and a specific wireless device 120a may operate as a base station/network node for another wireless device.

The wireless devices 100a to 100f may be connected to the network 130 through the base station 120. AI technology is applicable to the wireless devices 100a to 100f, and the wireless devices 100a to 100f may be connected to the AI server 100g through the network 130. The network 130 may be configured using a 3G network, a 4G (e.g., LTE) network or a 5G (e.g., NR) network, etc. The wireless devices 100a to 100f may communicate with each other through the base station 120/the network 130 or perform direct communication (e.g., sidelink communication) without through the base station 120/the network 130. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base station 120 and the base station 120/the base station 120. Here, wireless communication/connection may be established through various radio access technologies (e.g., 5GNR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
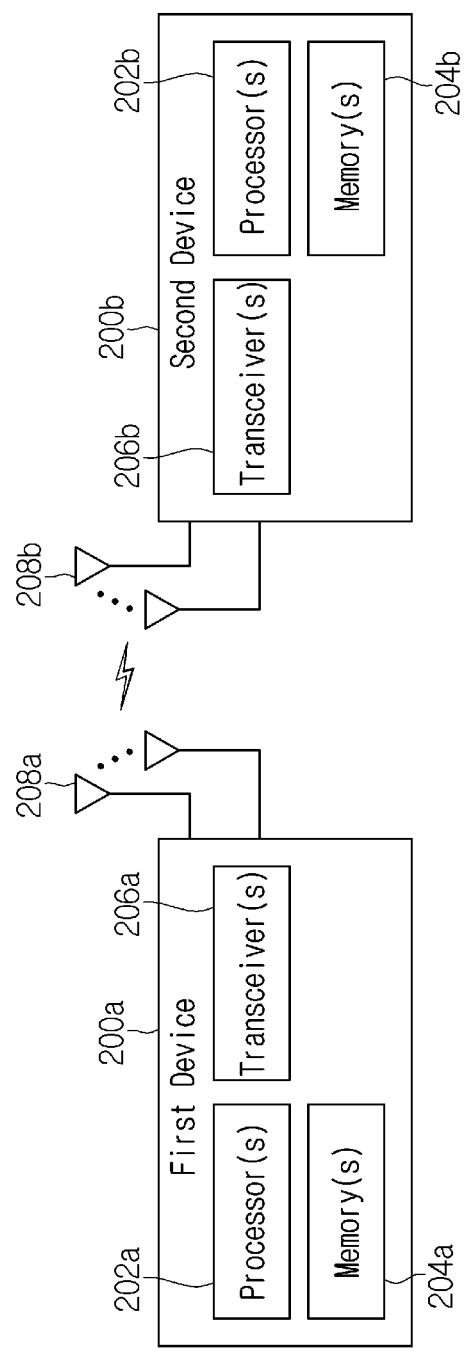
FIG. 2 is a view showing an example of a wireless apparatus applicable to the present disclosure.

FIG. 2 is a view showing an example of a wireless device applicable to the present disclosure.

Referring to FIG. 2, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be coupled with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be coupled with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may include one or more processors 202b and one or more memories 204b and may further include one or more transceivers 206b and/or one or more antennas 208b. The processor 202b may be configured to control the memory 204b and/or the transceiver 206*b* and to implement the descriptions, functions, procedures, proposals, methods and/or operational flowcharts disclosed herein. For example, the processor 202*b* may process information in the memory 204*b* to generate third information/signal and then transmit the third information/signal through the transceiver 206*b*. In addition, the processor 202*b* may receive a radio signal including fourth information/signal through the transceiver 206*b* and then store information obtained from signal processing of the fourth information/signal in the memory 204*b*. The memory 204*b* may be coupled with the processor 202*b* to store a variety of information related to operation of the processor 202*b*. For example, the memory 204*b* may store software code including instructions for performing all or some of the processes controlled by the processor 202*b* or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g., LTE or NR). The transceiver 206*b* may be coupled with the processor 202*b* to transmit and/or receive radio signals through one or more antennas 208*b*. The transceiver 206*b* may include a transmitter and/or a receiver. The transceiver 206*b* may be used interchangeably with a radio frequency (RF) unit. In the present disclosure, the wireless device may refer to a communication modem/circuit/chip.

Hereinafter, the wireless communication technology implemented in the wireless devices 200*a* and 200*b* of the present disclosure may include not only LTE, NR and 6G but also narrowband Internet of Things (NB-IoT) for low-power communication. At this time, for example, NB-IoT technology may be an example of low-power wide area network (LPWAN) technology and may be implemented in standards such as LTE Cat NB1 and/or LTE Cat NB2, without being limited to the above-described names. Additionally or alternatively, the wireless communication technology implemented in the wireless devices 200*a* and 200*b* of the present disclosure may perform communication based on LTE-M technology. At this time, for example, the LTE-M technology may be an example of LPWAN technology and may be called various names such as enhanced machine type communication (eMTC). For example, the LTE-M technology may be implemented in at least one of various standards such as 1) LTE CAT 0, 2) LTE Cat M1, 3) LTE Cat M2, 4) LTE non-BL(non-Bandwidth Limited), 5) LTE-MTC, 6) LTE Machine Type Communication and/or 7) LTE M, without being limited to the above-described names. Additionally or alternatively, the wireless communication technology implemented in the wireless devices 200*a* and 200*b* of the present disclosure may include at least one of ZigBee, Bluetooth or low-power wide area network considering low-power communication, without being limited to the above-described names. For example, ZigBee technology may generate personal area networks (PANs) related to small/low-power digital communication based on various standards such as IEEE 802.15.4 and may be called various names.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs) and/or one or more service data unit (SDU) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be coupled with one or more processors 202*a* and 202*b* to store various types of data, signals, messages, information, programs, code, instructions and/or commands. One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be coupled with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206*a* and 206*b* may be coupled with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206*a* and 206*b* receive user data, control information or radio signals from one or more other apparatuses. In addition, one or more transceivers 206*a* and 206*b* may be coupled with one or more antennas 208*a* and 208*b*, and one or more transceivers 206*a* and 206*b* may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Structure of Wireless Device Applicable to the Present Disclosure

Figure 3:
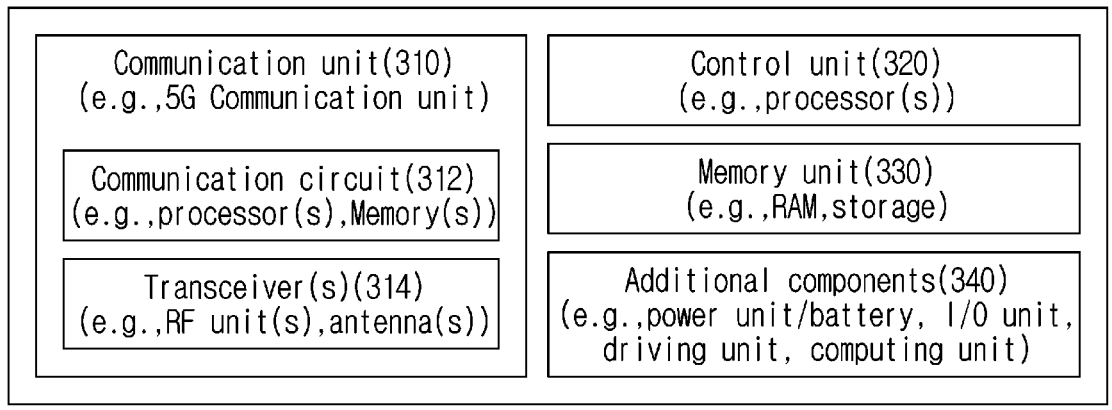
FIG. 3 is a view showing another example of a wireless device applicable to the present disclosure.

FIG. 3 is a view showing another example of a wireless device applicable to the present disclosure.

Referring to FIG. 3, a wireless device 300 may correspond to the wireless devices 200*a* and 200*b* of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202*a* and 202*b* and/or one or more memories 204*a* and 204*b* of FIG. 2. For example, the transceiver(s) 314 may include one or more transceivers 206*a* and 206*b* and/or one or more antennas 208*a* and 208*b* of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100*a*), the vehicles (FIGS. 1, 100*b*-1 and 100*b*-2), the XR device (FIG. 1, 100*c*), the hand-held device (FIG. 1, 100*d*), the home appliance (FIG. 1, 100*e*), the IoT device (FIG. 1, 100*f*), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 4:
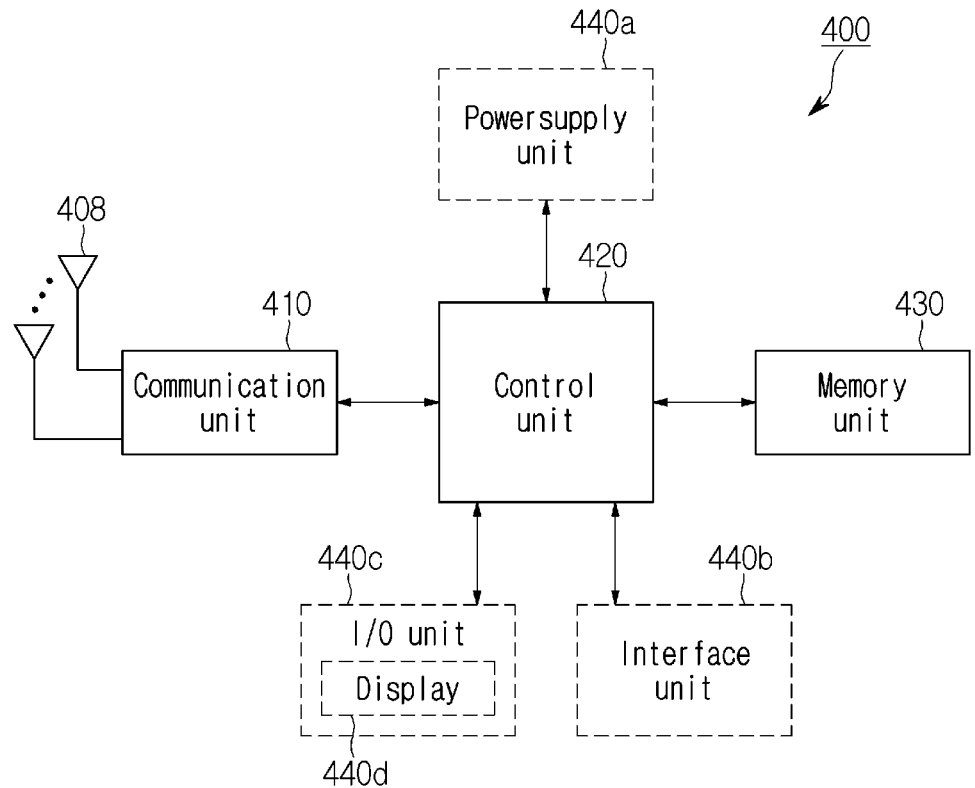
FIG. 4 is a view showing an example of a hand-held device applicable to the present disclosure.

FIG. 4 is a view showing an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440*a*, an interface unit (interface) 440*b*, and an input/output unit 440*c*. An antenna unit (antenna) 408 may be part of the communication unit 410. The blocks 410 to 430/440*a* to 440*c* may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440*a* may supply power to the hand-held device 400 and include a wired/wireless charging circuit, a battery, etc. The interface unit 440*b* may support connection between the hand-held device 400 and another external device. The interface unit 440*b* may include various ports (e.g., an audio input/output port and a video input/output port) for connection with the external device. The input/output unit 440*c* may receive or output video information/signals, audio information/signals, data and/or user input information. The input/output unit 440*c* may include a camera, a microphone, a user input unit, a display 440*d*, a speaker and/or a haptic module.

For example, in case of data communication, the input/output unit 440*c* may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440*c* in various forms (e.g., text, voice, image, video and haptic).

Type of Wireless Device Applicable to the Present Disclosure

Figure 5:
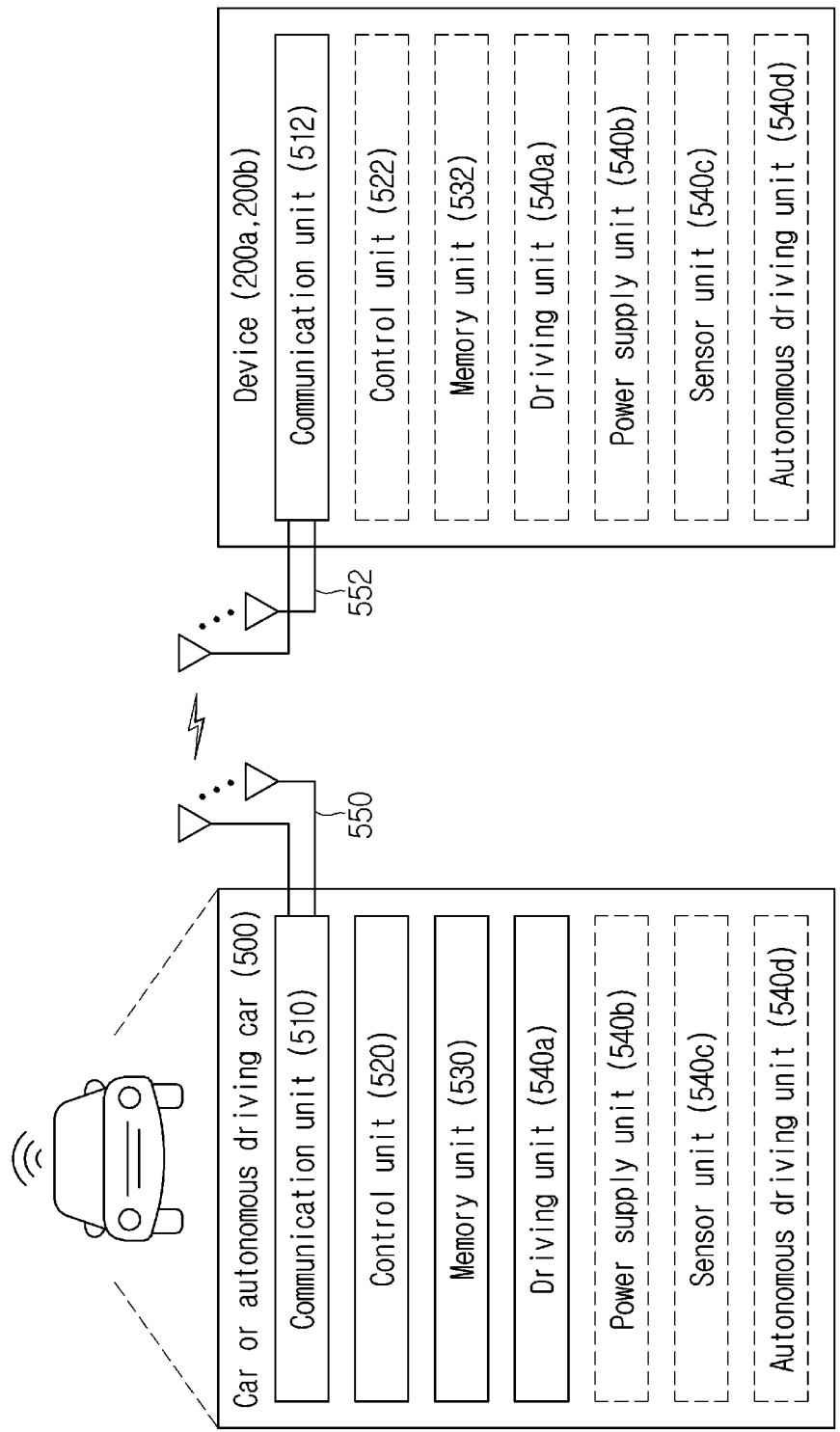
FIG. 5 is a view showing an example of a car or an autonomous driving car applicable to the present disclosure.

FIG. 5 is a view showing an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540*a*, a power supply unit (power supply) 540*b*, a sensor unit 540*c*, and an autonomous driving unit 540*d*. The antenna unit 550 may be configured as part of the communication unit 510. The blocks 510/530/540*a* to 540*d* correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU). The driving unit 540*a* may drive the car or autonomous driving car 500 on the ground. The driving unit 540*a* may include an engine, a motor, a power train, wheels, a brake, a steering device, etc. The power supply unit 540*b* may supply power to the car or autonomous driving car 500, and include a wired/wireless charging circuit, a battery, etc. The sensor unit 540*c* may obtain a vehicle state, surrounding environment information, user information, etc. The sensor unit 540*c* may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 540*d* may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 510 may receive map data, traffic information data, etc. from an external server. The autonomous driving unit 540*d* may generate an autonomous driving route and a driving plan based on the acquired data. The control unit 520 may control the driving unit 540*a* (e.g., speed/direction control) such that the car or autonomous driving car 500 moves along the autonomous driving route according to the driving plane. During autonomous driving, the communication unit 510 may aperiodically/periodically acquire latest traffic information data from an external server and acquire surrounding traffic information data from neighboring cars. In addition, during autonomous driving, the sensor unit 540*c* may acquire a vehicle state and surrounding environment information. The autonomous driving unit 540*d* may update the autonomous driving route and the driving plan based on newly acquired data/information. The communication unit 510 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

Figure 6:
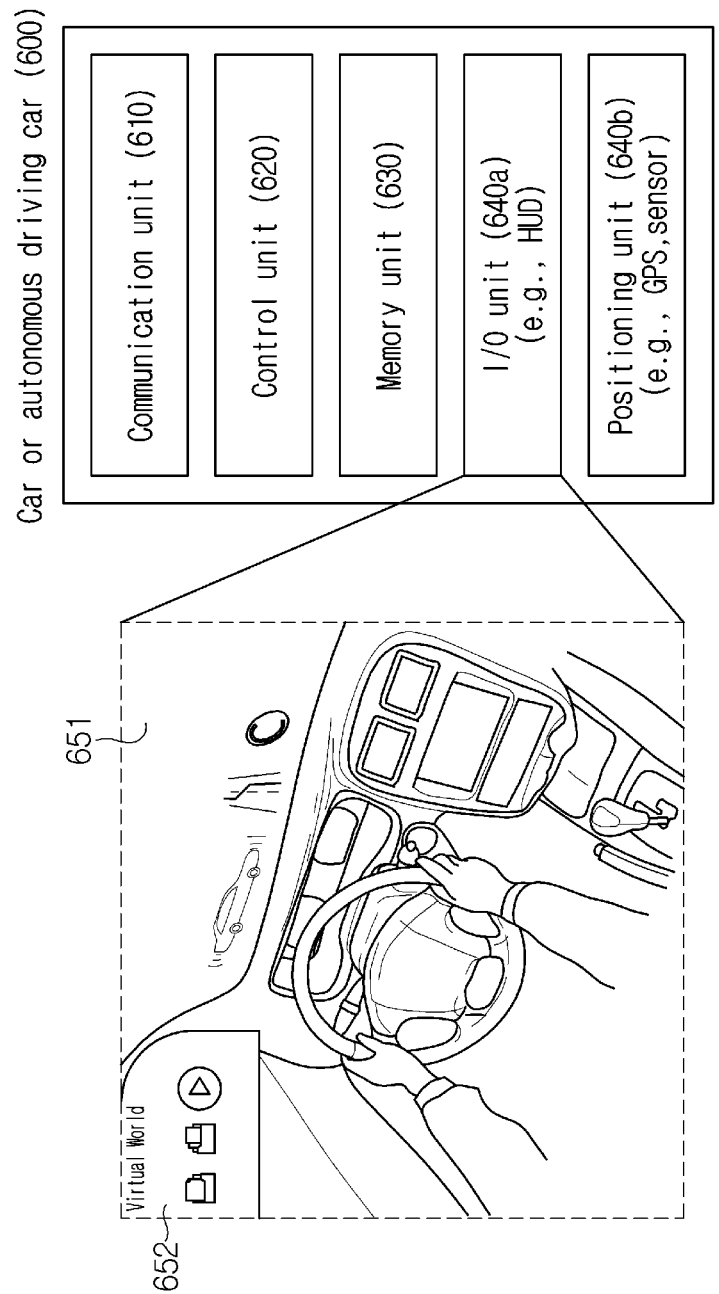
FIG. 6 is a view showing an example of a mobility applicable to the present disclosure.

FIG. 6 is a view showing an example of a mobility applicable to the present disclosure.

Referring to FIG. 6, the mobility applied to the present disclosure may be implemented as at least one of a transportation means, a train, an aerial vehicle or a ship. In addition, the mobility applied to the present disclosure may be implemented in the other forms and is not limited to the above-described embodiments.

At this time, referring to FIG. 6, the mobility 600 may include a communication unit (transceiver) 610, a control unit (controller) 620, a memory unit (memory) 630, an input/output unit 640*a* and a positioning unit 640*b*. Here, the blocks 610 to 630/640*a* to 640*b* may corresponding to the blocks 310 to 330/340 of FIG. 3.

The communication unit 610 may transmit and receive signals (e.g., data, control signals, etc.) to and from external devices such as another mobility or a base station. The control unit 620 may control the components of the mobility 600 to perform various operations. The memory unit 630 may store data/parameters/programs/code/instructions supporting the various functions of the mobility 600. The input/output unit 640*a* may output AR/VR objects based on information in the memory unit 630. The input/output unit 640*a* may include a HUD. The positioning unit 640*b* may acquire the position information of the mobility 600. The position information may include absolute position information of the mobility 600, position information in a driving line, acceleration information, position information of neighboring vehicles, etc. The positioning unit 640*b* may include a global positioning system (GPS) and various sensors.

For example, the communication unit 610 of the mobility 600 may receive map information, traffic information, etc. from an external server and store the map information, the traffic information, etc. in the memory unit 630. The positioning unit 640*b* may acquire mobility position information through the GPS and the various sensors and store the mobility position information in the memory unit 630. The control unit 620 may generate a virtual object based on the map information, the traffic information, the mobility position information, etc., and the input/output unit 640a may display the generated virtual object in a glass window (651 and 652). In addition, the control unit 620 may determine whether the mobility 600 is normally driven in the driving line based on the mobility position information. When the mobility 600 abnormally deviates from the driving line, the control unit 620 may display a warning on the glass window of the mobility through the input/output unit 640a. In addition, the control unit 620 may broadcast a warning message for driving abnormality to neighboring mobilities through the communication unit 610. Depending on situations, the control unit 620 may transmit the position information of the mobility and information on driving/mobility abnormality to a related institution through the communication unit 610.

Figure 7:
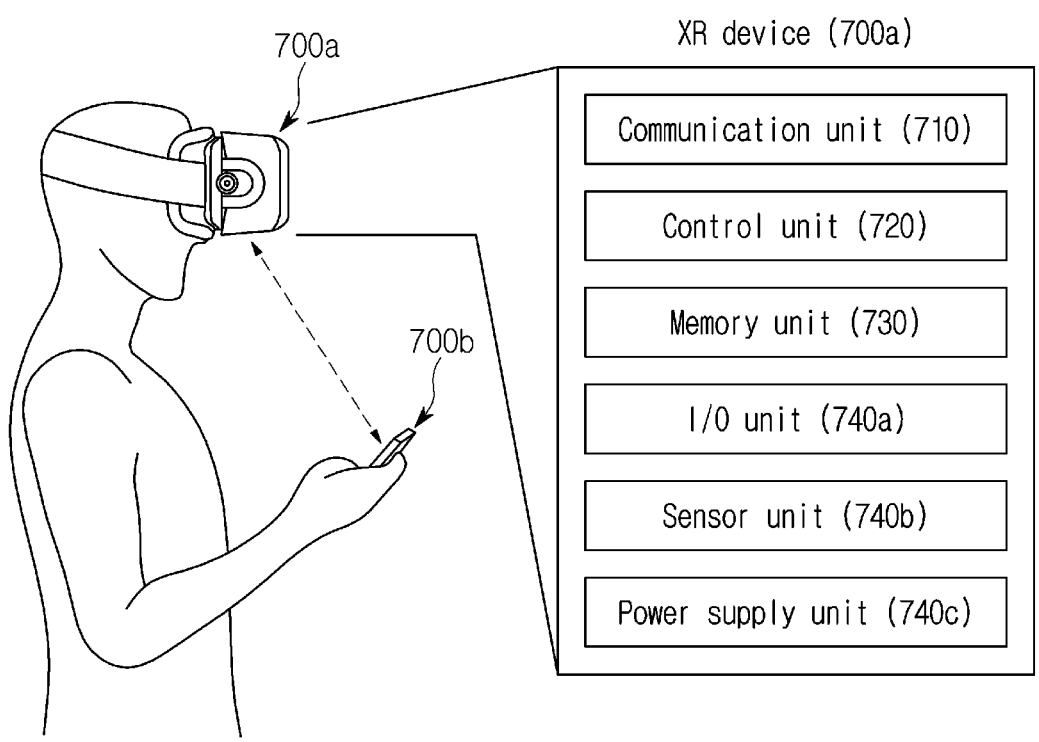
FIG. 7 is a view showing an example of an extended reality (XR) device applicable to the present disclosure.

FIG. 7 is a view showing an example of an XR device applicable to the present disclosure. The XR device may be implemented as a HMD, a head-up display (HUD) provided in a vehicle, a television, a smartphone, a computer, a wearable device, a home appliance, a digital signage, a vehicle, a robot, etc.

Referring to FIG. 7, the XR device 700a may include a communication unit (transceiver) 710, a control unit (controller) 720, a memory unit (memory) 730, an input/output unit 740a, a sensor unit 740b and a power supply unit (power supply) 740c. Here, the blocks 710 to 730/740a to 740c may correspond to the blocks 310 to 330/340 of FIG. 3, respectively.

The communication unit 710 may transmit and receive signals (e.g., media data, control signals, etc.) to and from external devices such as another wireless device, a hand-held device or a media server. The media data may include video, image, sound, etc. The control unit 720 may control the components of the XR device 700a to perform various operations. For example, the control unit 720 may be configured to control and/or perform procedures such as video/image acquisition, (video/image) encoding, metadata generation and processing. The memory unit 730 may store data/parameters/programs/code/instructions necessary to drive the XR device 700a or generate an XR object.

The input/output unit 740a may acquire control information, data, etc. from the outside and output the generated XR object. The input/output unit 740a may include a camera, a microphone, a user input unit, a display, a speaker and/or a haptic module. The sensor unit 740b may obtain an XR device state, surrounding environment information, user information, etc. The sensor unit 740b may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar. The power supply unit 740c may supply power to the XR device 700a and include a wired/wireless charging circuit, a battery, etc.

For example, the memory unit 730 of the XR device 700a may include information (e.g., data, etc.) necessary to generate an XR object (e.g., AR/VR/MR object). The input/output unit 740a may acquire an instruction for manipulating the XR device 700a from a user, and the control unit 720 may drive the XR device 700a according to the driving instruction of the user. For example, when the user wants to watch a movie, news, etc. through the XR device 700a, the control unit 720 may transmit content request information to another device (e.g., a hand-held device 700b) or a media server through the communication unit 730. The communication unit 730 may download/stream content such as a movie or news from another device (e.g., the hand-held device 700b) or the media server to the memory unit 730. The control unit 720 may control and/or perform procedures such as video/image acquisition, (video/image) encoding, metadata generation/processing, etc. with respect to content, and generate/output an XR object based on information on a surrounding space or a real object acquired through the input/output unit 740a or the sensor unit 740b.

In addition, the XR device 700a may be wirelessly connected with the hand-held device 700b through the communication unit 710, and operation of the XR device 700a may be controlled by the hand-held device 700b. For example, the hand-held device 700b may operate as a controller for the XR device 700a. To this end, the XR device 700a may acquire three-dimensional position information of the hand-held device 700b and then generate and output an XR object corresponding to the hand-held device 700b.

Figure 8:
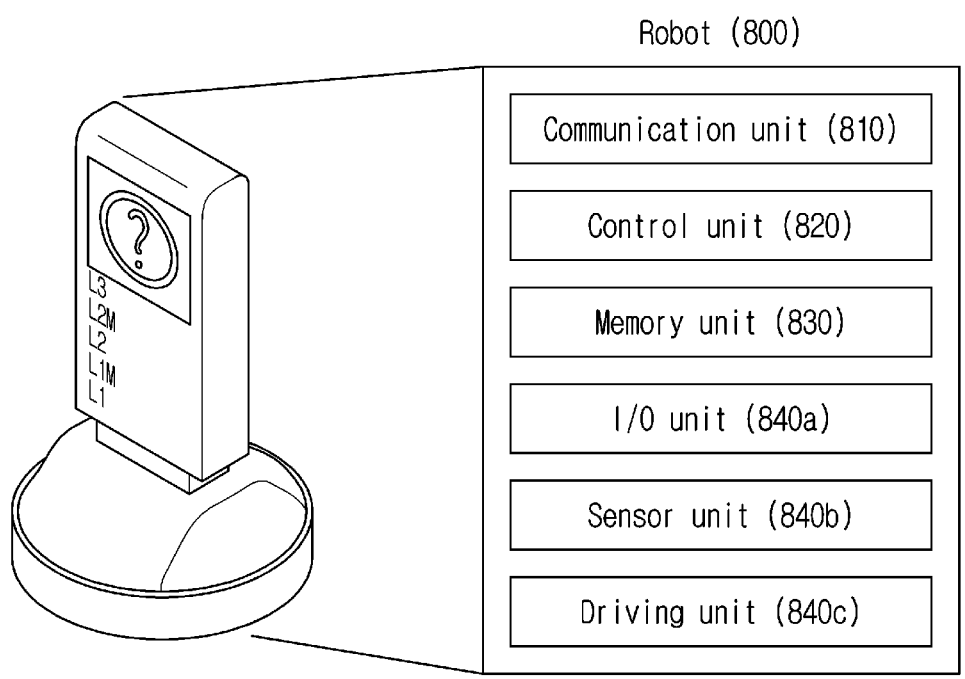
FIG. 8 is a view showing an example of a robot applicable to the present disclosure.

FIG. 8 is a view showing an example of a robot applicable to the present disclosure. For example, the robot may be classified into industrial, medical, household, military, etc. according to the purpose or field of use. At this time, referring to FIG. 8, the robot 800 may include a communication unit (transceiver) 810, a control unit (controller) 820, a memory unit (memory) 830, an input/output unit 840a, sensor unit 840b and a driving unit 840c. Here, blocks 810 to 830/840a to 840c may correspond to the blocks 310 to 330/340 of FIG. 3, respectively.

The communication unit 810 may transmit and receive signals (e.g., driving information, control signals, etc.) to and from external devices such as another wireless device, another robot or a control server. The control unit 820 may control the components of the robot 800 to perform various operations. The memory unit 830 may store data/parameters/programs/code/instructions supporting various functions of the robot 800. The input/output unit 840a may acquire information from the outside of the robot 800 and output information to the outside of the robot 800. The input/output unit 840a may include a camera, a microphone, a user input unit, a display, a speaker and/or a haptic module.

The sensor unit 840b may obtain internal information, surrounding environment information, user information, etc. of the robot 800. The sensor unit 840b may include a proximity sensor, an illumination sensor, an acceleration sensor, a magnetic sensor, a gyro sensor, an inertia sensor, an infrared (IR) sensor, a finger scan sensor, an ultrasonic sensor, an optical sensor, a microphone and/or a radar.

The driving unit 840c may perform various physical operations such as movement of robot joints. In addition, the driving unit 840c may cause the robot 800 to run on the ground or fly in the air. The driving unit 840c may include an actuator, a motor, wheels, a brake, a propeller, etc.

Figure 9:
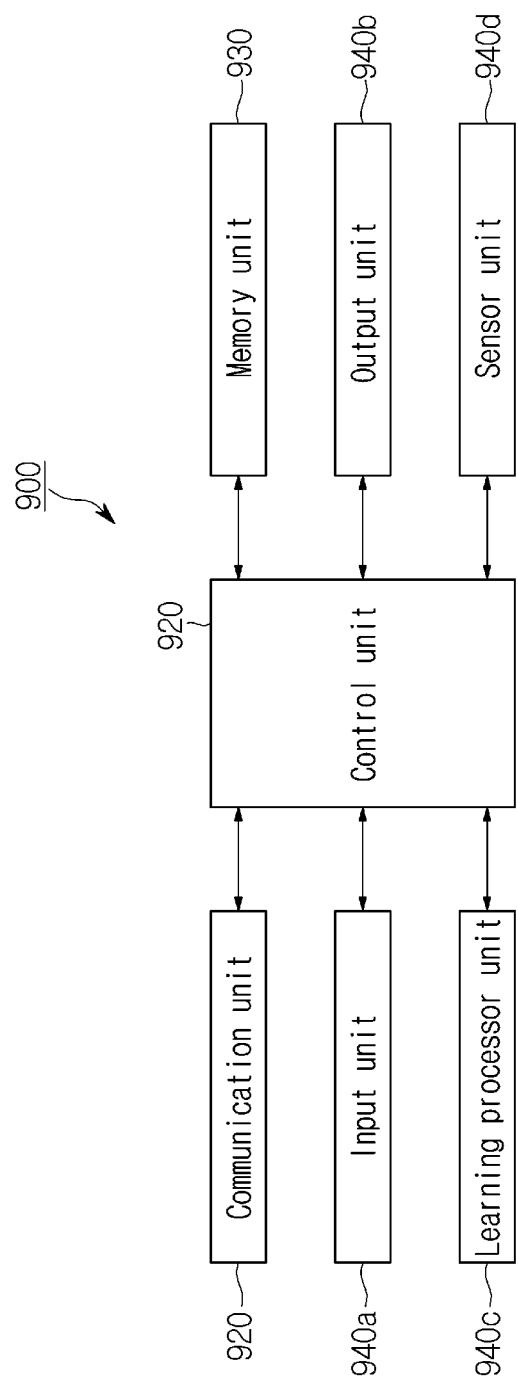
FIG. 9 is a view showing an example of artificial intelligence (AI) device applicable to the present disclosure.

FIG. 9 is a view showing an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 9, the AI device 900 may include a communication unit (transceiver) 910, a control unit (controller) 920, a memory unit (memory) 930, an input/output unit 940a/940b, a leaning processor unit (learning processor) 940c and a sensor unit 940d. The blocks 910 to 930/940a to 940d may correspond to the blocks 310 to 330/340 of FIG. 3, respectively.

The communication unit 910 may transmit and receive wired/wireless signals (e.g., sensor information, user input, learning models, control signals, etc.) to and from external devices such as another AI device (e.g., FIG. 1, 100x, 120 or 140) or the AI server (FIG. 1, 140) using wired/wireless communication technology. To this end, the communication unit 910 may transmit information in the memory unit 930 to an external device or transfer a signal received from the external device to the memory unit 930.

The control unit 920 may determine at least one executable operation of the AI device 900 based on information determined or generated using a data analysis algorithm or a machine learning algorithm. In addition, the control unit 920 may control the components of the AI device 900 to perform the determined operation. For example, the control unit 920 may request, search for, receive or utilize the data of the learning processor unit 940c or the memory unit 930, and control the components of the AI device 900 to perform predicted operation or operation, which is determined to be desirable, of at least one executable operation. In addition, the control unit 920 may collect history information including operation of the AI device 900 or user's feedback on the operation and store the history information in the memory unit 930 or the learning processor unit 940c or transmit the history information to the AI server (FIG. 1, 140). The collected history information may be used to update a learning model.

The memory unit 930 may store data supporting various functions of the AI device 900. For example, the memory unit 930 may store data obtained from the input unit 940a, data obtained from the communication unit 910, output data of the learning processor unit 940c, and data obtained from the sensing unit 940. In addition, the memory unit 930 may store control information and/or software code necessary to operate/execute the control unit 920.

The input unit 940a may acquire various types of data from the outside of the AI device 900. For example, the input unit 940a may acquire learning data for model learning, input data, to which the learning model will be applied, etc. The input unit 940a may include a camera, a microphone and/or a user input unit. The output unit 940b may generate video, audio or tactile output. The output unit 940b may include a display, a speaker and/or a haptic module. The sensing unit 940 may obtain at least one of internal information of the AI device 900, the surrounding environment information of the AI device 900 and user information using various sensors. The sensing unit 940 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 940c may train a model composed of an artificial neural network using training data. The learning processor unit 940c may perform AI processing along with the learning processor unit of the AI server (FIG. 1, 140). The learning processor unit 940c may process information received from an external device through the communication unit 910 and/or information stored in the memory unit 930. In addition, the output value of the learning processor unit 940c may be transmitted to the external device through the communication unit 910 and/or stored in the memory unit 930.

Physical Channels and General Signal Transmission

In a radio access system, a UE receives information from a base station on a DL and transmits information to the base station on a UL. The information transmitted and received between the UE and the base station includes general data information and a variety of control information. There are many physical channels according to the types/usages of information transmitted and received between the base station and the UE.

Figure 10:
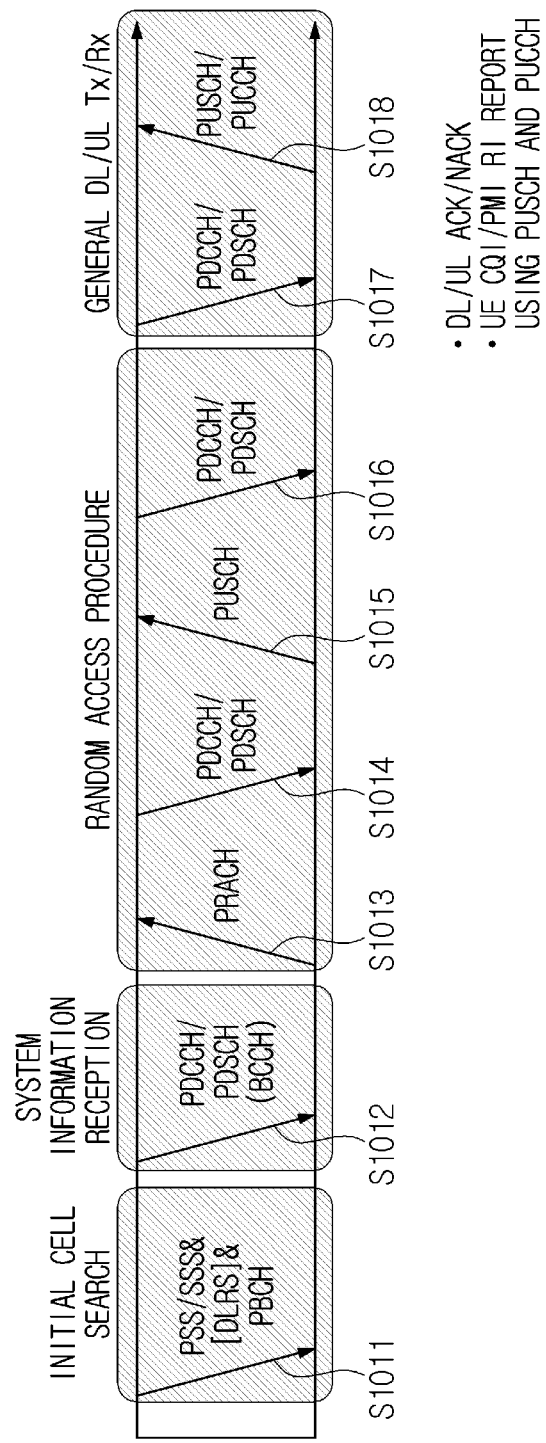
FIG. 10 is a view showing physical channels applicable to the present disclosure and a signal transmission method using the same.

FIG. 10 is a view showing physical channels applicable to the present disclosure and a signal transmission method using the same.

The UE which is turned on again in a state of being turned off or has newly entered a cell performs initial cell search operation in step S1011 such as acquisition of synchronization with a base station. Specifically, the UE performs synchronization with the base station, by receiving a Primary Synchronization Channel (P-SCH) and a Secondary Synchronization Channel (S-SCH) from the base station, and acquires information such as a cell Identifier (ID).

Thereafter, the UE may receive a physical broadcast channel (PBCH) signal from the base station and acquire intra-cell broadcast information. Meanwhile, the UE may receive a downlink reference signal (DL RS) in an initial cell search step and check a downlink channel state. The UE which has completed initial cell search may receive a physical downlink control channel (PDCCH) and a physical downlink control channel (PDSCH) according to physical downlink control channel information in step S1012, thereby acquiring more detailed system information.

Thereafter, the UE may perform a random access procedure such as steps S1013 to S1016 in order to complete access to the base station. To this end, the UE may transmit a preamble through a physical random access channel (PRACH) (S1013) and receive a random access response (RAR) to the preamble through a physical downlink control channel and a physical downlink shared channel corresponding thereto (S1014). The UE may transmit a physical uplink shared channel (PUSCH) using scheduling information in the RAR (S1015) and perform a contention resolution procedure such as reception of a physical downlink control channel signal and a physical downlink shared channel signal corresponding thereto (S1016).

The UE, which has performed the above-described procedures, may perform reception of a physical downlink control channel signal and/or a physical downlink shared channel signal (S1017) and transmission of a physical uplink shared channel (PUSCH) signal and/or a physical uplink control channel (PUCCH) signal (S1018) as general uplink/downlink signal transmission procedures.

The control information transmitted from the UE to the base station is collectively referred to as uplink control information (UCI). The UCI includes hybrid automatic repeat and request acknowledgement/negative-ACK (HARQ-ACK/NACK), scheduling request (SR), channel quality indication (CQI), precoding matrix indication (PMI), rank indication (RI), beam indication (BI) information, etc. At this time, the UCI is generally periodically transmitted through a PUCCH, but may be transmitted through a PUSCH in some embodiments (e.g., when control information and traffic data are simultaneously transmitted). In addition, the UE may aperiodically transmit UCI through a PUSCH according to a request/instruction of a network.

Figure 11:
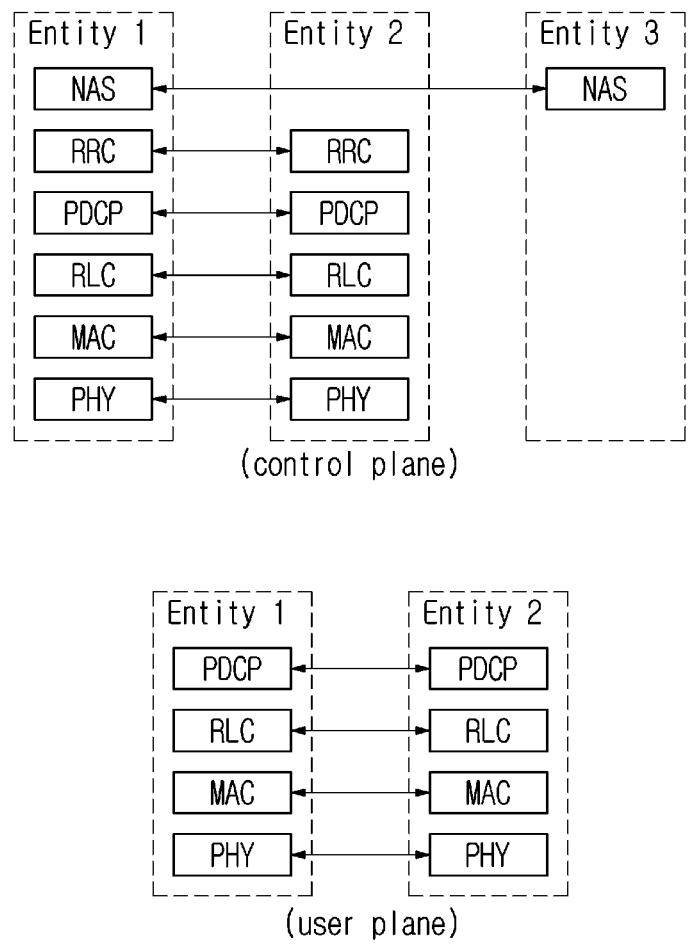
FIG. 11 is a view showing the structure of a control plane and a user plane of a radio interface protocol applicable to the present disclosure.

FIG. 11 is a view showing the structure of a control plane and a user plane of a radio interface protocol applicable to the present disclosure.

Referring to FIG. 11, Entity 1 may be a user equipment (UE). At this time, the UE may be at least one of a wireless device, a hand-held device, a vehicle, a mobility, an XR device, a robot or an AI device, to which the present disclosure is applicable in FIGS. 1 to 9. In addition, the UE refers to a device, to which the present disclosure is applicable, and is not limited to a specific apparatus or device.

Entity 2 may be a base station. At this time, the base station may be at least one of an eNB, a gNB or an ng-eNB. In addition, the base station may refer to a device for transmitting a downlink signal to a UE and is not limited to a specific apparatus or device. That is, the base station may be implemented in various forms or types and is not limited to a specific form.

Entity 3 may be a device for performing a network apparatus or a network function. At this time, the network apparatus may be a core network node (e.g., mobility management entity (MME) for managing mobility, an access and mobility management function (AMF), etc. In addition, the network function may mean a function implemented in order to perform a network function. Entity 3 may be a device, to which a function is applied. That is, Entity 3 may refer to a function or device for performing a network function and is not limited to a specific device.

A control plane refers to a path used for transmission of control messages, which are used by the UE and the network to manage a call. A user plane refers to a path in which data generated in an application layer, e.g. voice data or Internet packet data, is transmitted. At this time, a physical layer which is a first layer provides an information transfer service to a higher layer using a physical channel. The physical layer is connected to a media access control (MAC) layer of a higher layer via a transmission channel. At this time, data is transmitted between the MAC layer and the physical layer via the transmission channel. Data is also transmitted between a physical layer of a transmitter and a physical layer of a receiver via a physical channel. The physical channel uses time and frequency as radio resources.

The MAC layer which is a second layer provides a service to a radio link control (RLC) layer of a higher layer via a logical channel. The RLC layer of the second layer supports reliable data transmission. The function of the RLC layer may be implemented by a functional block within the MAC layer. A packet data convergence protocol (PDCP) layer which is the second layer performs a header compression function to reduce unnecessary control information for efficient transmission of an Internet protocol (IP) packet such as an IPv4 or IPv6 packet in a radio interface having relatively narrow bandwidth. A radio resource control (RRC) layer located at the bottommost portion of a third layer is defined only in the control plane. The RRC layer serves to control logical channels, transmission channels, and physical channels in relation to configuration, re-configuration, and release of radio bearers. A radio bearer (RB) refers to a service provided by the second layer to transmit data between the UE and the network. To this end, the RRC layer of the UE and the RRC layer of the network exchange RRC messages. A non-access stratum (NAS) layer located at a higher level of the RRC layer performs functions such as session management and mobility management. One cell configuring a base station may be set to one of various bandwidths to provide a downlink or uplink transmission service to several UEs. Different cells may be set to provide different bandwidths. Downlink transmission channels for transmitting data from a network to a UE may include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at a higher level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 12:
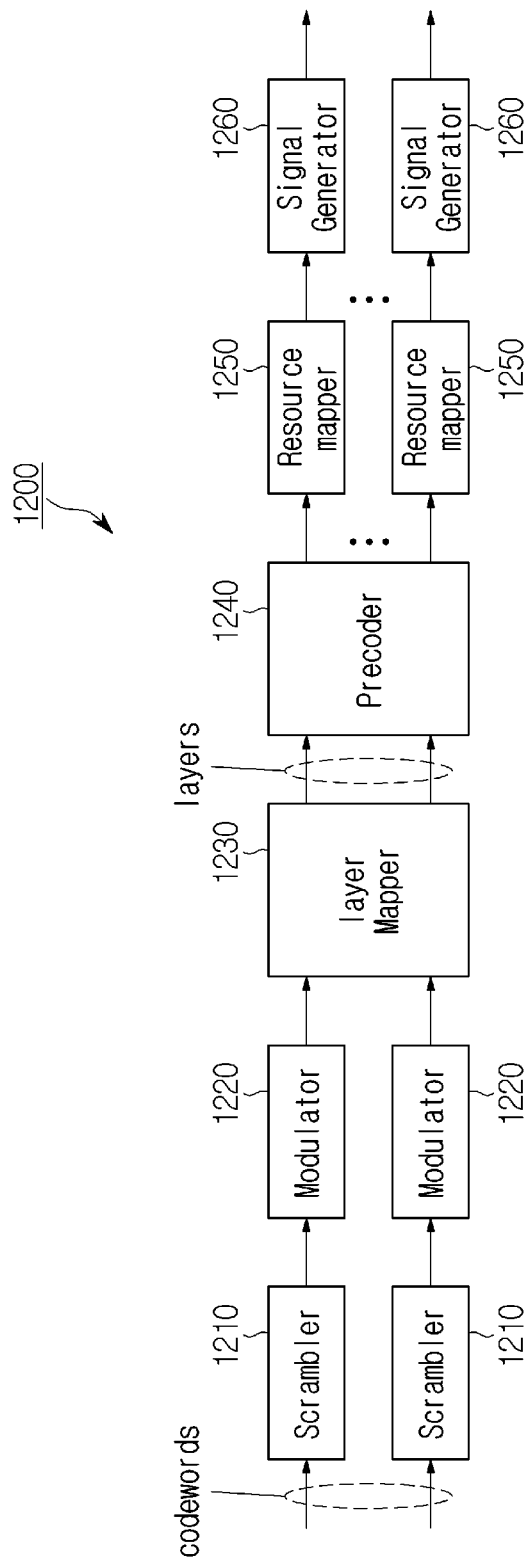
FIG. 12 is a view showing a method of processing a transmitted signal applicable to the present disclosure.

FIG. 12 is a view showing a method of processing a transmitted signal applicable to the present disclosure. For example, the transmitted signal may be processed by a signal processing circuit. At this time, a signal processing circuit 1200 may include a scrambler 1210, a modulator 1220, a layer mapper 1230, a precoder 1240, a resource mapper 1250, and a signal generator 1260. At this time, for example, the operation/function of FIG. 12 may be performed by the processors 202a and 202b and/or the transceiver 206a and 206b of FIG. 2. In addition, for example, the hardware element of FIG. 12 may be implemented in the processors 202a and 202b of FIG. 2 and/or the transceivers 206a and 206b of FIG. 2. For example, blocks 1010 to 1060 may be implemented in the processors 202a and 202b of FIG. 2. In addition, blocks 1210 to 1250 may be implemented in the processors 202a and 202b of FIG. 2 and a block 1260 may be implemented in the transceivers 206a and 206b of FIG. 2, without being limited to the above-described embodiments.

A codeword may be converted into a radio signal through the signal processing circuit 1200 of FIG. 12. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a bit sequence scrambled by the scrambler 1210. The scramble sequence used for scramble is generated based in an initial value and the initial value may include ID information of a wireless device, etc. The scrambled bit sequence may be modulated into a modulated symbol sequence by the modulator 1220. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 1230. Modulation symbols of each transport layer may be mapped to corresponding antenna port(s) by the precoder 1240 (precoding). The output z of the precoder 1240 may be obtained by multiplying the output y of the layer mapper 1230 by an N*M precoding matrix W. Here, N may be the number of antenna ports and M may be the number of transport layers. Here, the precoder 1240 may perform precoding after transform precoding (e.g., discrete Fourier transform (DFT)) for complex modulation symbols. In addition, the precoder 1240 may perform precoding without performing transform precoding.

The resource mapper 1250 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 1260 may generate a radio signal from the mapped modulation symbols, and the generated radio signal may be transmitted to another device through each antenna. To this end, the signal generator 1260 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 1210 to 1260 of FIG. 12. For example, the wireless device (e.g., 200a or 200b of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

Figure 13:
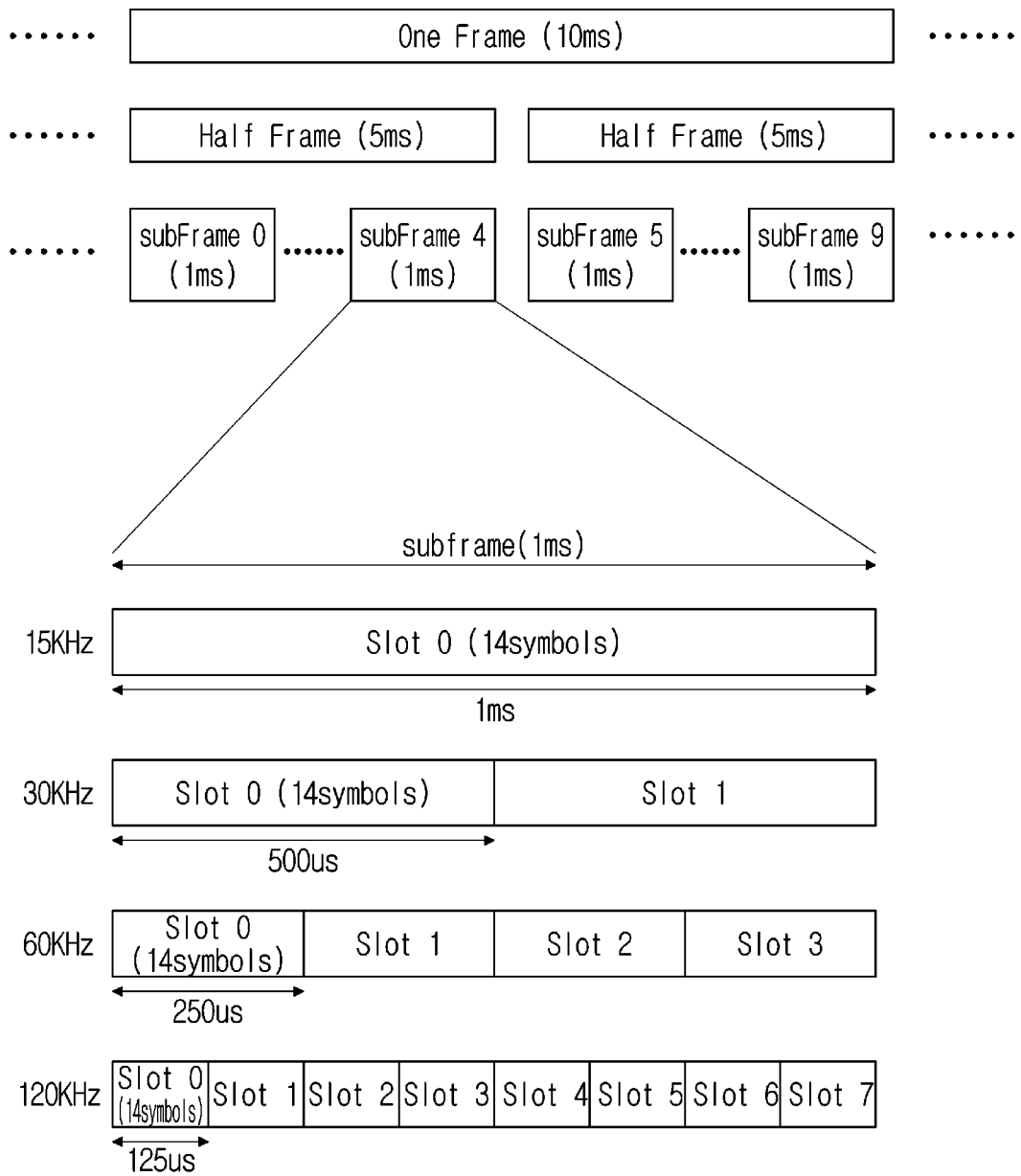
FIG. 13 is a view showing the structure of a radio frame applicable to the present disclosure.

FIG. 13 is a view showing the structure of a radio frame applicable to the present disclosure.

UL and DL transmission based on an NR system may be based on the frame shown in FIG. 13. At this time, one radio frame has a length of 10 ms and may be defined as two 5-ms half-frames (HFs). One half-frame may be defined as five 1-ms subframes (SFs). One subframe may be divided into one or more slots and the number of slots in the subframe may depend on subscriber spacing (SCS). At this time, each slot may include 12 or 14 OFDM(A) symbols according to cyclic prefix (CP). If normal CP is used, each slot may include 14 symbols. If an extended CP is used, each slot may include 12 symbols. Here, the symbol may include an OFDM symbol (or a CP-OFDM symbol) and an SC-FDMA symbol (or a DFT-s-OFDM symbol).

Table 1 shows the number of symbols per slot according to SCS, the number of slots per frame and the number of slots per subframe when normal CP is used, and Table 2 shows the number of symbols per slot according to SCS, the number of slots per frame and the number of slots per subframe when extended CP is used.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| μ | $N_{symb}^{slot}$ | $N_{slot}^{frame,\mu}$ | $N_{slot}^{subframe,\mu}$ |
|---|---|---|---|
| 2 | 12 | 40 | 4 |

In Tables 1 and 2 above, $N_{symb}^{slot}$ may indicate the number of symbols in a slot, $N_{slot}^{frame,\mu}$ may indicate the number of slots in a frame, and $N_{slot}^{subframe,\mu}$ may indicate the number of slots in a subframe.

In addition, in a system, to which the present disclosure is applicable, OFDM(A) numerology (e.g., SCS, CP length, etc.) may be differently set among a plurality of cells merged to one UE. Accordingly, an (absolute time) period of a time resource (e.g., an SF, a slot or a TTI) (for convenience, collectively referred to as a time unit (TU)) composed of the same number of symbols may be differently set between merged cells.

NR may support a plurality of numerologies (or subscriber spacings (SCSs)) supporting various 5G services. For example, a wide area in traditional cellular bands is supported when the SCS is 15 kHz, dense-urban, lower latency and wider carrier bandwidth are supported when the SCS is 30 kHz/60 kHz, and bandwidth greater than 24.25 GHz may be supported to overcome phase noise when the SCS is 60 kHz or higher.

The NR frequency band is defined as two types (FR1 and FR2) of frequency ranges. FR1 and FR2 may be configured as shown in Table below. Also, FR2 may mean millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In addition, for example, in a communication system, to which the present disclosure is applicable, the above-described numerology may be differently set. For example, a terahertz wave (THz) band may be used as a frequency band higher than FR2. In the THz band, the SCS may be set greater than that of the NR system, and the number of slots may be differently set, without being limited to the above-described embodiments. The THz band will be described below.

Figure 14:
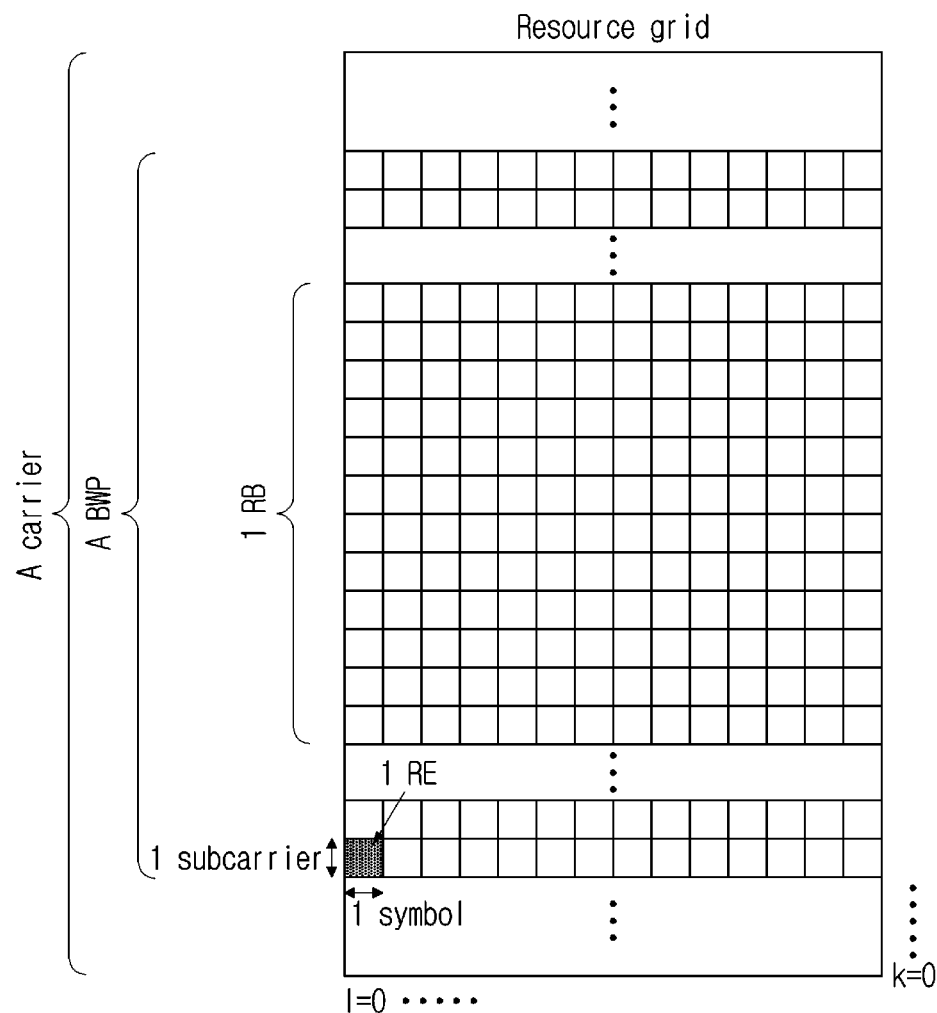
FIG. 14 is a view showing a slot structure applicable to the present disclosure.

FIG. 14 is a view showing a slot structure applicable to the present disclosure.

One slot includes a plurality of symbols in the time domain. For example, one slot includes seven symbols in case of normal CP and one slot includes six symbols in case of extended CP. A carrier includes a plurality of subcarriers in the frequency domain. A resource block (RB) may be defined as a plurality (e.g., 12) of consecutive subcarriers in the frequency domain.

In addition, a bandwidth part (BWP) is defined as a plurality of consecutive (P)RBs in the frequency domain and may correspond to one numerology (e.g., SCS, CP length, etc.).

The carrier may include a maximum of N (e.g., five) BWPs. Data communication is performed through an activated BWP and only one BWP may be activated for one UE. In resource grid, each element is referred to as a resource element (RE) and one complex symbol may be mapped.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 4 below. That is, Table 4 shows the requirements of the 6G system.

TABLE 4

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 15:
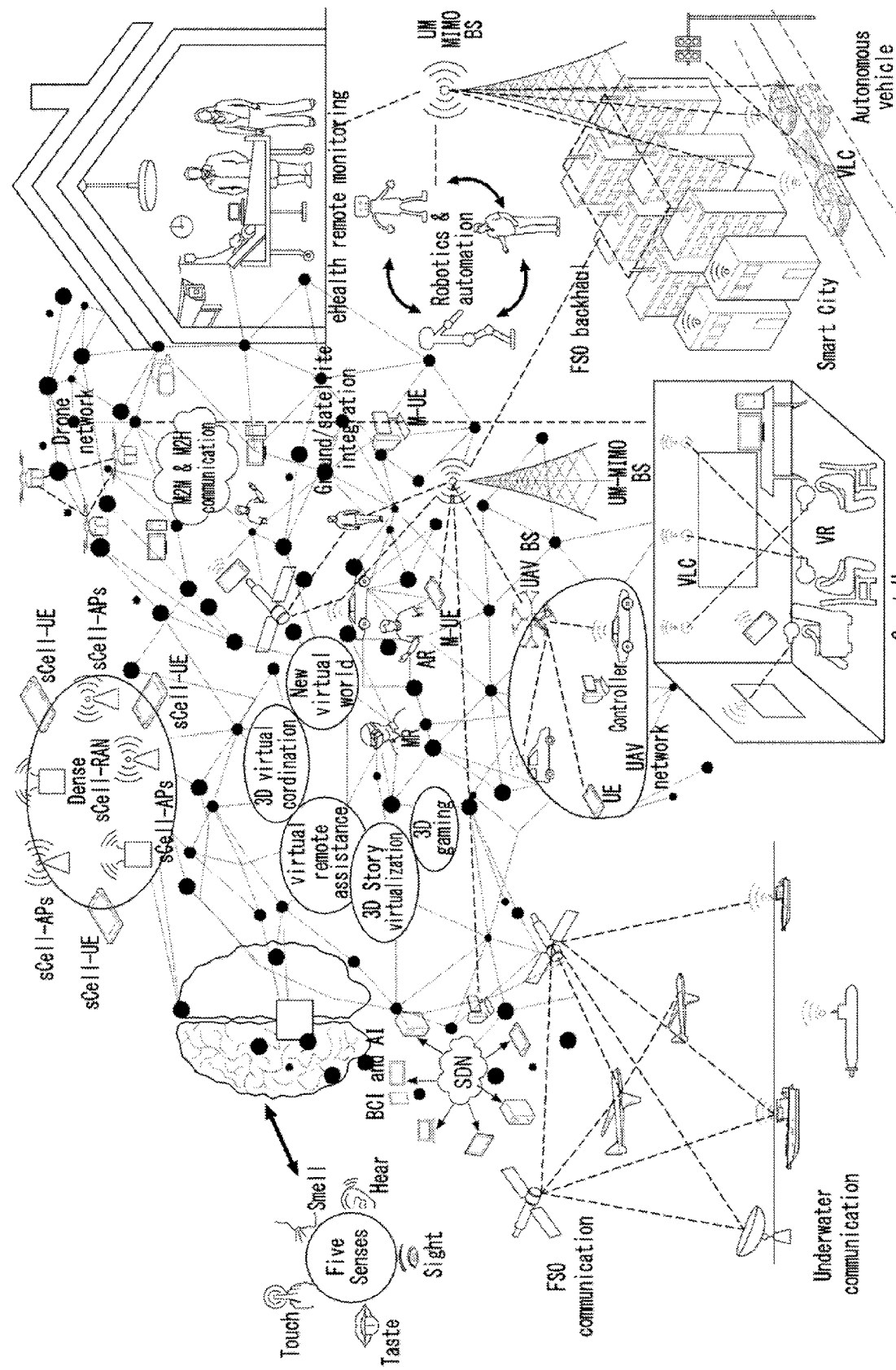
FIG. 15 is a view showing an example of a communication structure providable in a 6th generation (6G) system applicable to the present disclosure.

FIG. 15 is a view showing an example of a communication structure providable in a 6G system applicable to the present disclosure.

Referring to FIG. 15, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduces costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5GB network in order to ensure flexibility, reconfigurability and programmability.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to build a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to the 6G system. For example, a data rate may increase by increasing bandwidth. This may be performed by using sub-THz communication with wide bandwidth and applying advanced massive MIMO technology.

Figure 16:
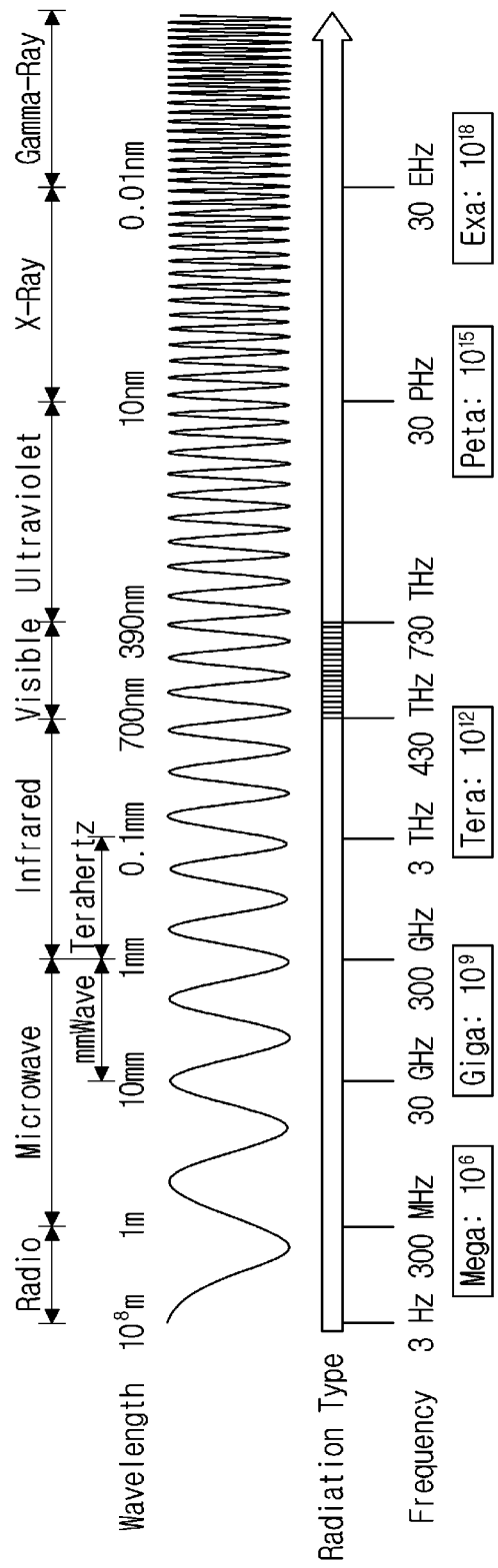
FIG. 16 is a view showing an electromagnetic spectrum applicable to the present disclosure.

FIG. 16 is a view showing an electromagnetic spectrum applicable to the present disclosure. For example, referring to FIG. 16, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated by the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network.

Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large Intelligent Surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

THz Wireless Communication

Figure 17:
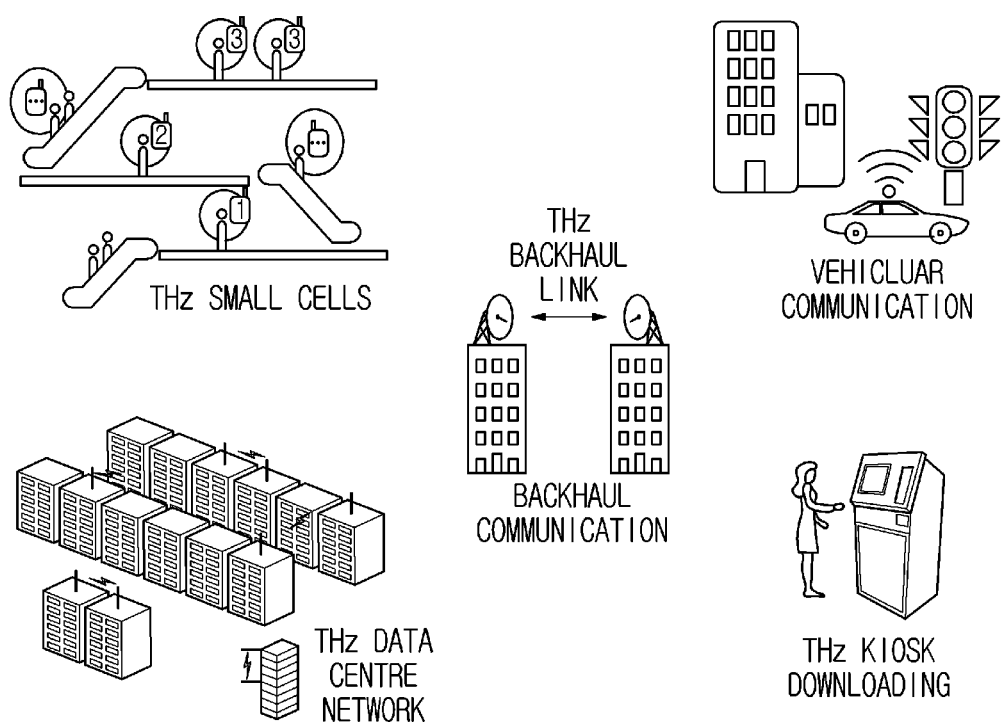
FIG. 17 is a view showing a THz communication method applicable to the present disclosure.

FIG. 17 is a view showing a THz communication method applicable to the present disclosure.

Referring to FIG. 17, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Specifically, referring to FIG. 17, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading. Table 5 below shows an example of technology which may be used in the THz wave.

TABLE 5

| | |
|---|---|
| Transceivers Device | Available immature: UTC-PD, RTD and SBD |
| Modulation and coding | Low order modulation techniques (OOK, QPSK), LDPC. Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

Figure 18:
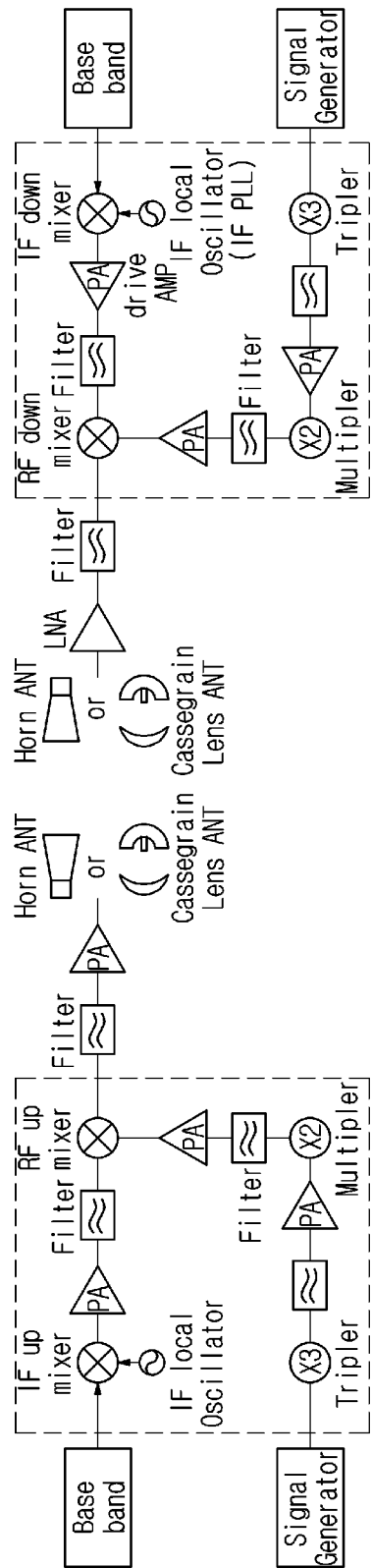
FIG. 18 is a view showing a THz wireless communication transceiver applicable to the present disclosure.

FIG. 18 is a view showing a THz wireless communication transceiver applicable to the present disclosure.

Referring to FIG. 18, THz wireless communication may be classified based on the method of generating and receiving THz. The THz generation method may be classified as an optical component or electronic component based technology.

At this time, the method of generating THz using an electronic component includes a method using a semiconductor component such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF represents an intermediate frequency, a tripler and a multiplier represents a multiplier, PA represents a power amplifier, and LNA represents a low noise amplifier, and PLL represents a phase-locked loop.

Figure 19:
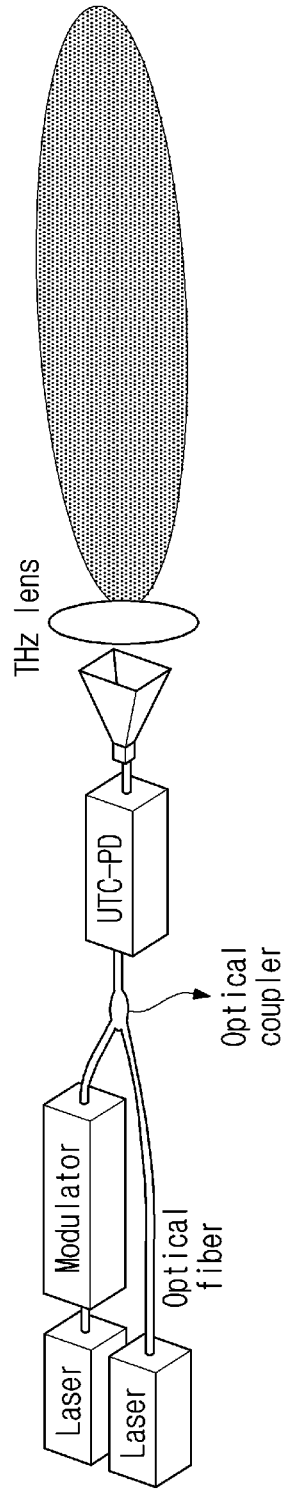
FIG. 19 is a view showing a THz signal generation method applicable to the present disclosure.
Figure 20:
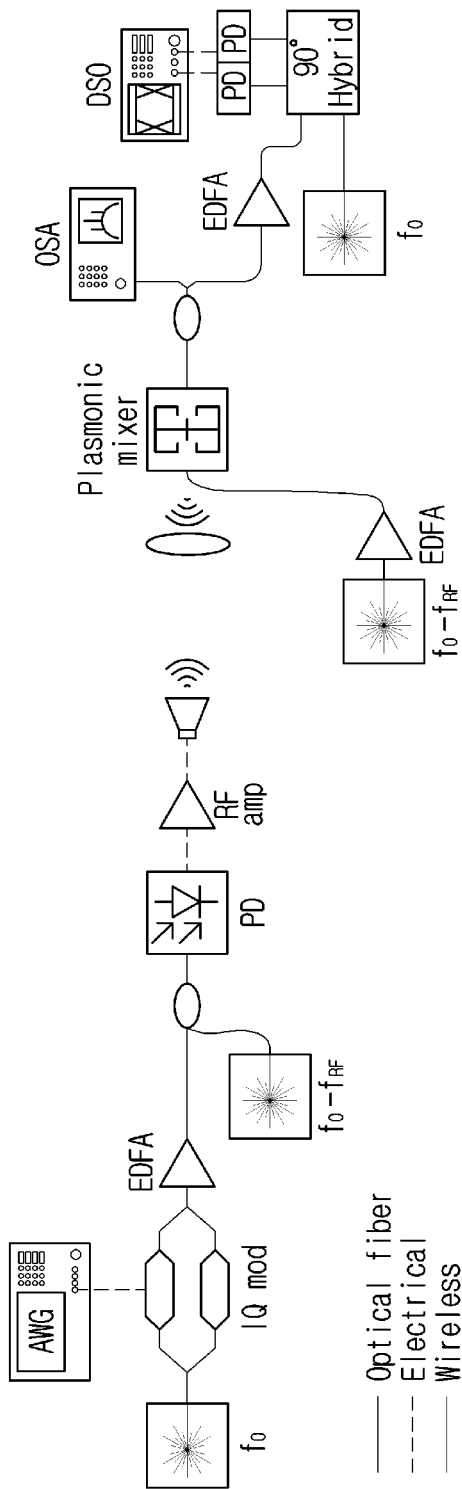
FIG. 20 is a view showing a wireless communication transceiver applicable to the present disclosure.

FIG. 19 is a view showing a THz signal generation method applicable to the present disclosure. FIG. 20 is a view showing a wireless communication transceiver applicable to the present disclosure.

Referring to FIGS. 19 and 20, the optical component-based THz wireless communication technology means a method of generating and modulating a THz signal using an optical component. The optical component-based THz signal generation technology refers to a technology that generates an ultrahigh-speed optical signal using a laser and an optical modulator, and converts it into a THz signal using an ultrahigh-speed photodetector. This technology is easy to increase the frequency compared to the technology using only the electronic component, can generate a high-power signal, and can obtain a flat response characteristic in a wide frequency band. In order to generate the THz signal based on the optical component, as shown in FIG. 19, a laser diode, a broadband optical modulator, and an ultrahigh-speed photodetector are required. In the case of FIG. 19, the light signals of two lasers having different wavelengths are combined to generate a THz signal corresponding to a wavelength difference between the lasers. In FIG. 19, an optical coupler refers to a semiconductor component that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 20, an erbium-doped fiber amplifier (EDFA) represents an optical fiber amplifier to which erbium is added, a photo detector (PD) represents a semiconductor component capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 21:
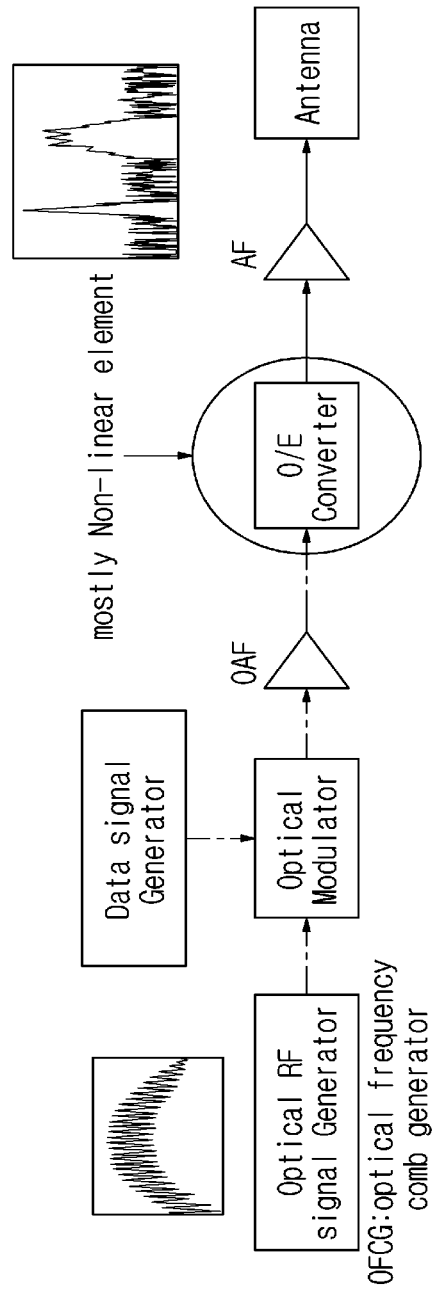
FIG. 21 is a view showing a transmitter structure applicable to the present disclosure.
Figure 22:
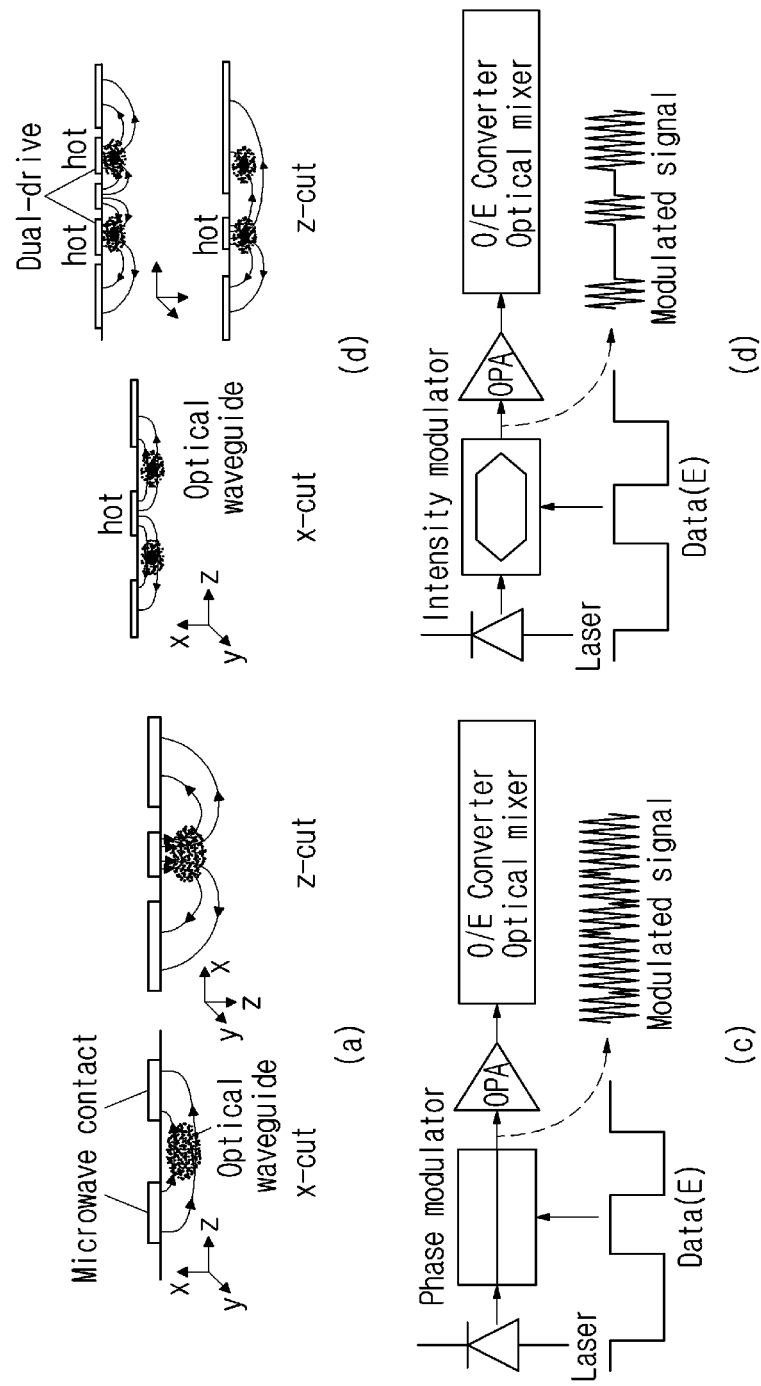
FIG. 22 is a view showing a modulator structure applicable to the present disclosure.

FIG. 21 is a view showing a transmitter structure applicable to the present disclosure. FIG. 22 is a view showing a modulator structure applicable to the present disclosure.

Referring to FIGS. 21 and 22, generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the component.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal non-linearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

Specific Embodiment of the Present Disclosure

The present disclosure relates to retransmission of data in a wireless communication system, and is to perform hybrid automatic repeat request (HARQ) retransmission in an environment in which channel encoding and decoding using an outer code are performed.

In the NR standard, a maximum data rate is defined to support 20 Gbps/10 Gbps for downlink and uplink, respectively. When providing high throughput in NR, the size of a transport block included in a slot increases. In this case, if the transport block is split into code block units, one transport block may be split into a large number of code blocks. According to the current NR standard, when a transmission error in code block units occurs, in order to increase retransmission efficiency, a transmitter performs retransmission in units of CBG (code-block group). The transmitter retransmits data in units of code-block groups, increasing retransmission efficiency compared to the case of retransmitting the entire transport block. According to the current NR standard specification, the transmitter may transmit up to 8 code-block groups.

However, when the transport block is split in units of code-block groups, if the number of code blocks included in one code-block group increases, the error probability of the code-block group may greatly increase. Accordingly, the retransmission rate of the code-block group may increase and the overall throughput may decrease. Specifically, the error rate of a code block and the error rate of a code-block group have a relationship shown in Equation 1 below.

$$BLER_{CBG}=1-\Pi_{l=1}^{N}(1-CB\_BLER_l) \qquad \text{Equation 1}$$

In Equation 1, $BLER_{CBG}$ denotes a block error rate (BLER) of a code-block group, CB_BLREI denotes a BLER of an l-th code block of the code-block group, and N denotes the number of code blocks included in one code-block group.

Figure 23:
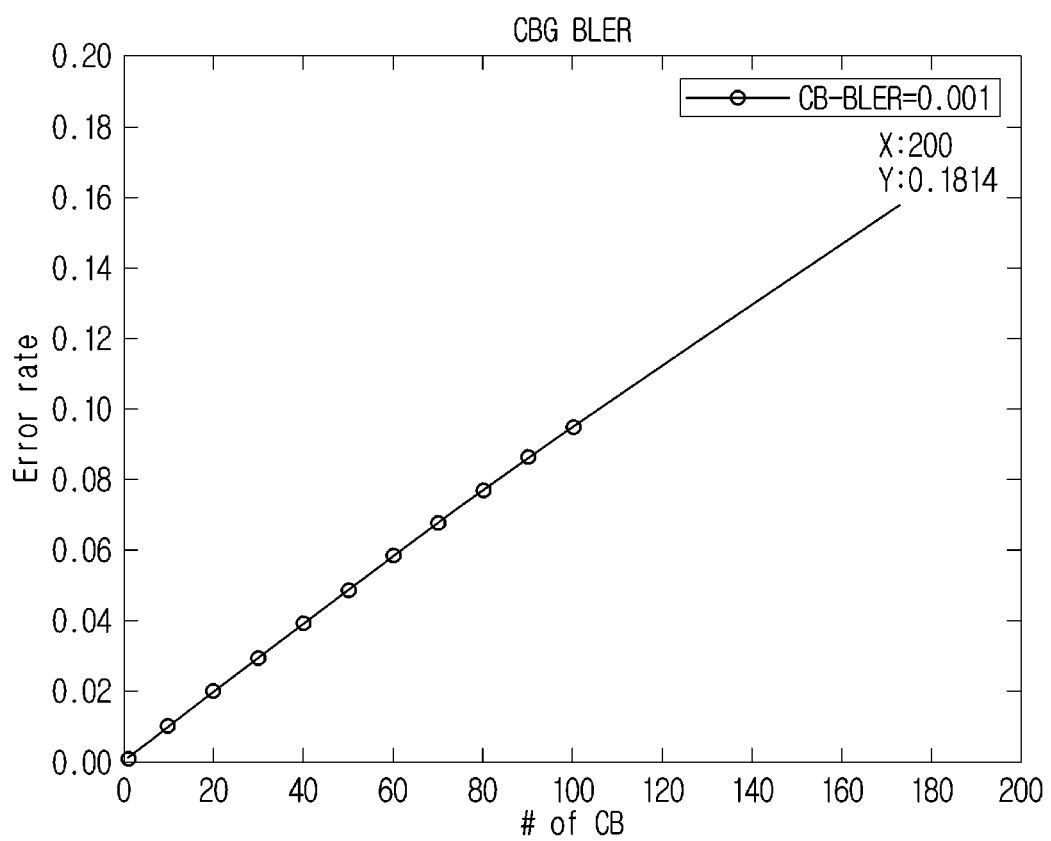
FIG. 23 is a diagram illustrating a relationship between the number of code blocks included in a code-block group and block error rate (BLER) performance of the code-block group.

Referring to Equation 1, CBG-BLER increases exponentially with the number of code blocks included in a code-block group, which is shown in FIG. 23 as a graph.

FIG. 23 is a diagram illustrating a relationship between the number of code blocks included in a code-block group and block error rate (BLER) performance of the code-block group. FIG. 23 illustrates a code-block group unit error rate according to the number of code blocks per code-block group when the error rate of the code block is 0.001. Referring to FIG. 23, when the number of code blocks per code-block group reaches 100, the error rate increases 10 times. That is, referring to FIG. 23, when the code block error rate is 0.001, it is confirmed that the code-block group error rates when the number of code blocks in the code-block group is 10 and 100 are 0.01 and 0.1, respectively.

In tera-bit per second (bps) communication, a short code is preferred to satisfy an implementation key performance indicator (KPI) (e.g., area, power, energy). Also, to support tera-bps, the size of a transport block may be larger. When a larger transport block is segmented into smaller code blocks, the number of segments increases. In this case, as shown in Equation 1, TB-BLER may be larger.

Accordingly, the present disclosure proposes a method of lowering the error rate of the transport block level when the number of code blocks in the transport block is large. To this end, a transmitter may apply an additional outer block coding technique. In addition, in order to increase the error correction rate of block coding, a receiver may apply erasure decoding using an inner coding syndrome or a CB-CRC.

Here, the syndrome is a result of parity check and represents whether there is an error in a codeword. The result of the syndrome check has a length equal to the number of parities. For example, if the number of parity bits is M, syndrome check results of length M are generated, and if the value of the M syndrome check results is '0', this means that there is no error in the codeword. If there is an error, the location of the error and the value of the error may be calculated based on the syndrome check results, and the error may be corrected. That is, in some cases, syndrome check may replace CRC check.

According to various embodiments of the present disclosure, the device may lower the error rate of the transport block level using outer coding. The device may lower the retransmission rate by lowering the error of the transport block level or the code block level, and obtain a gain in terms of transmission resources and transmission latency. In addition, the present disclosure proposes a method of effectively performing HARQ retransmission based on a relationship between an outer code and an inner code.

Figure 24:
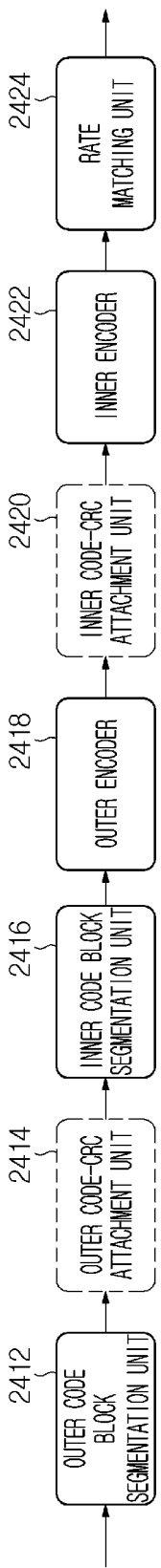
FIG. 24 is a diagram illustrating a structure of a transmitter applicable to the present disclosure.

FIG. 24 is a diagram illustrating a structure of a transmitter applicable to the present disclosure.

Referring to FIG. 24, the transmitter may include an outer code block segmentation unit 2412, an outer code-CRC attachment unit 2414, an inner code block segmentation unit 2416, an outer encoder 2418, an inner code-CRC attachment unit 2420, an inner encoder 2422, and a rate matching unit 2424.

The outer code block segmentation unit 2412 segments the transport block into a plurality of outer code blocks. The transport blocks segmented by the outer code block segmentation unit 2412 may be a transport block comprising a CRC. The segmented outer code blocks are provided to the outer code-CRC attachment unit 2414.

The outer code-CRC attachment unit 2414 may attach a CRC to each of a plurality of outer code blocks. The outer code-CRC attachment unit 2414 may send the plurality of outer code blocks attached with the CRC to the inner code block segmentation unit 2416. However, according to another embodiment, the outer code-CRC attachment unit 2414 may be omitted.

The inner code block segmentation unit 2416 may segment each of the plurality of outer code blocks into a plurality of inner code blocks. The inner code block segmentation unit 2416 may send the plurality of inner code blocks segmented from the outer code block to the outer encoder 2418.

The outer encoder 2418 outer-encodes the plurality of outer code blocks. According to an embodiment, the outer encoder 2418 may form information bits for outer coding by rearranging bits included in the plurality of inner code blocks, and outer-code the information bits. Through this, the outer encoder 2418 may generate parity bits of each of the plurality of outer code blocks. Here, additional inner code blocks (e.g., parity blocks) are formed based on the parity bits. For example, the outer encoder 2418 may perform outer coding based on a reed-solmon (RS) code.

The inner code-CRC attachment unit 2420 may attach a CRC to each of the plurality of inner code blocks. The inner code-CRC attachment unit 2420 may send the plurality of inner code blocks attached with the CRC to the inner encoder 2422. However, according to another embodiment, the inner code-CRC attachment unit 2420 may be omitted.

The inner encoder 2422 inner-codes the plurality of inner code blocks. For example, the inner encoder 3420 may perform inner coding based on an LDPC code. The inner encoder 2422 may send the plurality of inner-coded inner code blocks to the rate matching unit 2424.

The rate matching unit 2424 performs rate matching on the plurality of inner code blocks. In other words, the rate matching unit 2424 adjusts the size and code rate of the plurality of inner-coded (e.g., LDPC code-based inner coded) internal code blocks. For example, the rate matching unit 2424 may perform at least one operation of pruning, puncturing, and shortening of at least some of the bits obtained through encoding.

Figure 25:
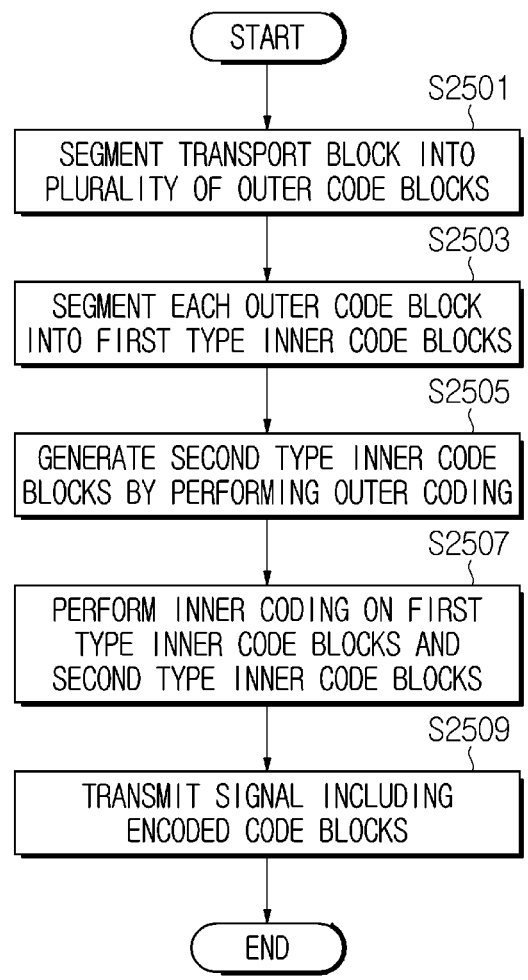
FIG. 25 is a diagram illustrating an embodiment of a procedure for transmitting data in a device applicable to the present disclosure.

FIG. 25 is a diagram illustrating an embodiment of a procedure for transmitting data in a device applicable to the present disclosure. FIG. 25 illustrates a method by performed a device comprising a transmitter (e.g., the transmitter of FIG. 24). In the following description, the operating subject of FIG. 25 is referred to as 'device', but may be referred to as a transmission end, a transmission device, a transmitter or a term having equivalent technical meaning.

Referring to FIG. 25, in step S2501, the device segments a transport block into a plurality of outer code blocks. The device may segment the transport block into outer code blocks which are units for performing outer coding. Here, the transport block comprises data (e.g., PDU) provided in an upper layer. In this case, before segmenting the transport block, the device may attach a CRC (e.g., TB-CRC) to the transport block and segment a bit string including the CRC. In this case, at least one outer coding block may include at least part of the CRC attached to the transport block.

In step S2503, the device segments each of the outer code blocks into first type inner code blocks. The device may segment each outer code block into inner code blocks which are units for performing inner coding. Accordingly, a plurality of first type inner code blocks are generated.

In step S2505, the device generates second type inner code blocks by performing outer coding. Specifically, the device generates codewords corresponding to outer code blocks by performing outer coding on the first type inner code blocks generated from outer code blocks. Here, information bits for generating one codeword are extracted from the plurality of first type inner code blocks. By outer coding, parity bits for outer code blocks are generated, and the second type inner code blocks are generated from parity bits generated by outer coding. That is, the second type inner code blocks include parity bits of outer code blocks. For example, the device may perform outer coding based on a RS code.

In step S2507, the device performs inner coding on the first type inner code blocks and the second type inner code blocks. For example, the device may perform inner coding based on an LDPC code. In this case, the device may perform inner coding on the inner code blocks without attaching a CRC to the inner code blocks.

In step S2509, the device transmits a signal including encoded code blocks. The device may generate a modulation symbol from the code blocks according to a constellation, map the generated modulation symbols to resources, and then send them through at least one transmission antenna.

In the embodiment described with reference to FIG. 25, the device generates the inner code blocks by segmenting the outer code block. At this time, the CRC is not attached to the outer code block. However, according to another embodiment, the device may attach the CRC to each of the plurality of outer code blocks segmented from the transport block. Accordingly, error detection of each outer code block is possible in a receiver. In this case, the device may generate second type inner code blocks by segmenting each of the outer code blocks including the CRC into first type inner code blocks and performing outer coding on the first type inner code blocks.

Figure 26:
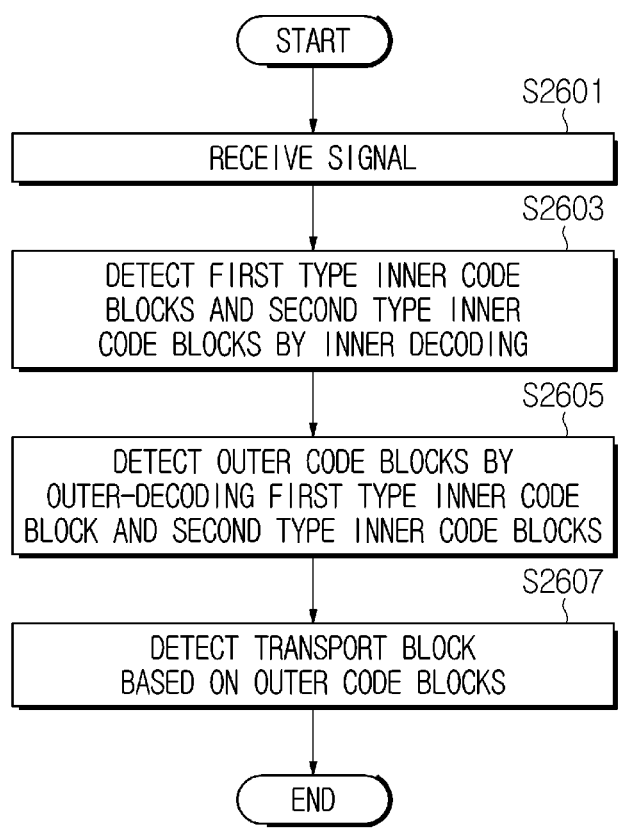
FIG. 26 is a diagram illustrating an embodiment of a procedure for receiving data in a device applicable to the present disclosure.

FIG. 26 is a diagram illustrating an embodiment of a procedure for receiving data in a device applicable to the present disclosure. FIG. 26 illustrates a method by performed a device comprising a receiver corresponding to a transmitter (e.g., the transmitter of FIG. 24). In the following description, the operating subject of FIG. 26 is referred to as a 'device', but may be referred to as a reception end, a reception device, a receiver, or a term having equivalent technical meaning.

Referring to FIG. 26, in step S2601, the device receives a signal. The device receives the signal through at least one antenna. The received signal may include outer-coded and inner-coded data.

In step S2603, the device detects first type inner code blocks and second type inner code blocks by performing inner decoding. The device may detect first type inner code blocks and second type inner code blocks by detecting modulation symbols from the received signal and performing inner decoding on the modulation symbols. For example, the device may perform inner decoding based on an LDPC code.

In step S2605, the device detects outer code blocks by performing outer decoding on the first type inner code blocks and the second type inner code blocks. Each of codewords corresponding to the outer code blocks includes bits selected from a plurality of code blocks. Thus, the device may generate codewords by relocating the bits contained in the first type inner code blocks and the second type inner code blocks, and perform outer decoding on the codewords. According to an embodiment, the device may perform erasure decoding based on the outer code.

In step S2607, the device detects a transport blocks based on the outer code blocks. That is, the device may generate the transport block by concatenating the outer code blocks. When the generated transport is a transport block including a CRC, the device may perform CRC check on the transport block.

In the embodiments described with reference to FIGS. 25 and 26, the inner code blocks are segmented into first type inner code blocks and second type inner code blocks. Here, the first type inner code blocks and the second type inner code blocks may not be treated differently in inner coding, and the first type inner code blocks and the second type inner code blocks are classified according to the relationship with outer coding. Specifically, the first type inner code blocks include information bits from the standpoint of outer coding, and the second type inner code blocks include parity bits from the standpoint of outer coding. Therefore, the first type inner code blocks may be referred to as 'information bit-based inner code blocks', 'code blocks (CBs)' or other terms having equivalent technical meaning. The second type inner code blocks be referred to as 'parity bit-based inner code blocks', 'parity blocks (PBs)' or other terms having equivalent technical meaning.

Like the above-described embodiments, outer coding/decoding and inner coding/decoding may be performed. To this end, data blocks (e.g., transport blocks) are segmented into outer coding blocks, and each outer coding block is segmented into inner coding blocks. As a result, the error rate of the transport block level may be lowered, and the retransmission rate may be lowered. As a result, gain may be obtained from resources and latency. Hereinafter, in the present disclosure, the outer coding block may be referred to as a term 'outer block group (OBG)' or a term having equivalent technical meaning. In addition, in the present disclosure, the inner coding block may be referred to as a term 'code block (CB)' or a term having equivalent technical meaning.

Figure 27:
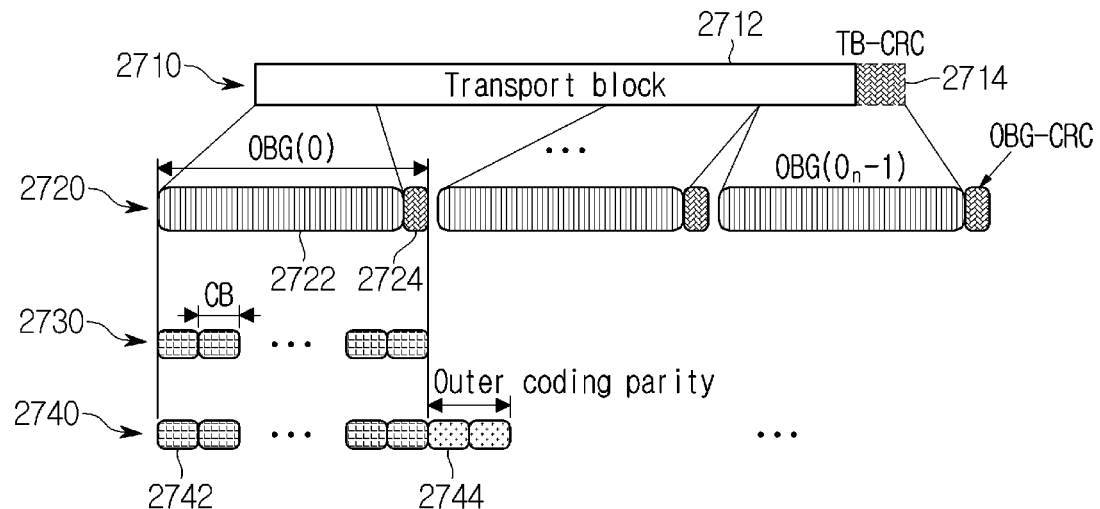
FIG. 27 is a diagram illustrating an embodiment of a transport block outer-coded by a device applicable to the present disclosure.

FIG. 27 is a diagram illustrating an embodiment of a transport block outer-coded by a device applicable to the present disclosure. FIG. 27 illustrates a transport block that is outer-coded by a device including a transmitter (e.g., the transmitter of FIG. 24). In FIG. 27, the outer code block is represented by an OBG and the inner code block is represented by a CB.

Referring to FIG. 27, a TB-CRC 2714 is attached by performing CRC encoding on a transport block 2712. A data block 2710 including the transport block 2712 and the TB-CRC 2714 is formed by attaching the TB-CRC 2714 to the transport block 2712. The data block 2710, that is, the transport block including CRC data is segmented to have uniform size according to the number of OBGs. In other words, the data block 2710 is segmented into the plurality of OBGs 2720. Each OBG 2720 includes a data block 2722 segmented from the data block 2710 and an OBG-CRC 2724. That is, the OBG-CRC 2724 is attached to each OBG. However, according to another embodiment, the OBG-CRC attachment operation may be omitted.

Figure 28:
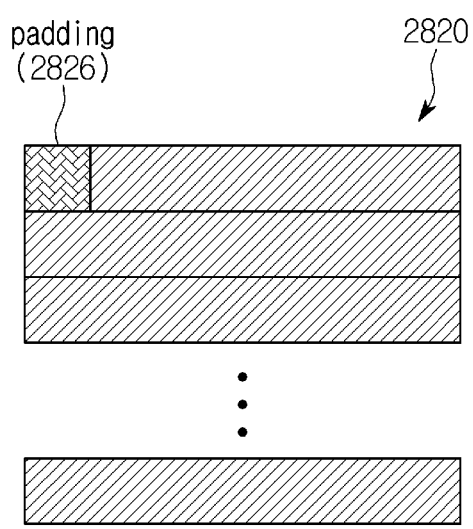
FIG. 28 is a diagram illustrating an example of adding padding to an outer code block outer-coded by a device applicable to the present disclosure.

Each of the OBGs 2720 is segmented into a plurality of CBs 2730. That is, each of the OBGs 2720 is segmented into CBs 2730 having a uniform size. If the OBG-CRC 2724 is present, each of the OBGs 2720, including the OBG-CRC 2724, is equally segmented. At this time, padding may be added to segment each of the OBGs 2720 as needed. FIG. 28 is a diagram illustrating an example in which padding is added to an outer code block that is outer-coded by the device applicable to the present disclosure. Referring to FIG. 28, the OBG 2820 may include at least one padding bit 2822. At least one padding bit 2826 may be added to the front end of the first CB, or may be added to the first end of the last CB, as shown in FIG. 28. At least one padded bit 2822 may include a bit string consisting of 0 (zero).

Outer coding is performed on the plurality of CBs 2730 obtained from the OBG 2720, thereby generating outer-coded CBs 2740. The outer-coded CBs 2740 include the first type CBs 2742 segmented from the OBGs 2720 and the second type CBs 2744 including the parity bits generated by outer coding. Although not shown in FIG. 27, a CB-CRC may be attached to each of the CBs 2740. However, according to another embodiment, the CB-CRC attachment operation may be omitted. Inner coding is performed on the CBs 2740 including the CB-CRC or the CBs 2740 not including the CB-CRC, and rate matching is performed.

Figure 29:
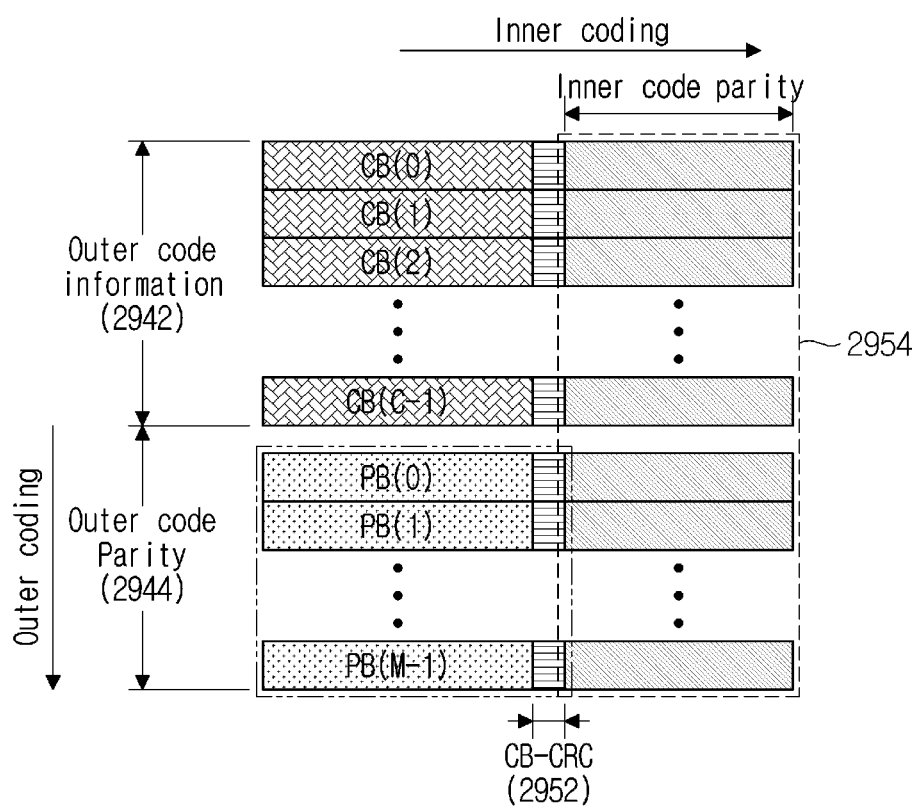
FIG. 29 is a diagram illustrating an embodiment of outer coding and inner coding performed by a device applicable to the present disclosure.

Inner coding and outer coding are performed, as described in FIGS. 27 and 28. At this time, for outer coding, as shown in FIG. 29, code blocks are written row-wise and encoded column-wise. FIG. 29 is a diagram illustrating an embodiment of outer coding and inner coding performed by a device applicable to the present disclosure.

Referring to FIG. 29, outer coding is performed on C CBs such as CB (0) to CB (C−1). At this time, code blocks are written row-wise and outer-encoded column-wise. Accordingly, a bit string of length C comprising the first bits of each of the CB (0) to the CB (C−1) is encoded based on the outer code, thereby generating a parity of length M. The parity generated from the first bits of each of the CB (0) to the CB (C−1) becomes the first bits of each of PB (0) to PB (M−1). By repeated outer encoding, an outer code parity 2944 including PB (0) to PB (M−1) is obtained from the outer code information 2942 including CB (0) to CB (C−1). The outer code parity 2944 includes M bit strings having a CB size.

Thereafter, inner coding is performed on CB(0) to CB(C−1) and PB(0) to PB(M−1). Prior to inner coding, a CB-CRC 2952 may be attached to CB(0) to CB(C−1) and PB(0) to PB(M−1). In other words, the CB-CRC 2592 may be attached to the generated outer code parity 2944 and outer code information 2942. Thereafter, an inner code parity 2954 is generated through inner coding.

As described above, outer coding and inner coding may be performed on the transport block. Outer coding according to various embodiments have the following properties.

As outer coding according to an embodiment, erasure outer coding may be used. For example, for outer coding, a reed-solomon (RS) code may be used. The RS code has characteristics shown in Equation 2 below.

$$2t \approx e + 2\rho \quad \text{Equation 2}$$

In Equation 2, 2t denotes the number of parity bits, e denotes the number of erasures, and $\rho$ denotes the number of errors.

Referring to Equation 4, when using the RS code, if the location of the error is not known, up to t errors corresponding to half a parity size may be corrected. On the other hand, if the location of the error is known, up to 2t errors corresponding to a parity size may be corrected.

Accordingly, a reception device according to various embodiments may use an inner code-CRC or an inner code syndrome to determine the location and number of errors, and maximize error correction through erasure decoding. If an inner code block containing an error is identified through the inner code-CRC or inner code syndrome (e.g., LDPC code syndrome) check, the location and number of bits in which an error is expected may be determined based on a row-wise writing-column-wise encoding structure of the above-mentioned outer encoding.

As the location and number of errors in the outer code blocks are predicted, it is determined in advance whether an error has occurred within a correctable range through erasure decoding, and which error shall be overcome to be correctable may be determined. That is, in applying HARQ retransmission, results of predicting the location and number of errors in the outer code blocks based on a result of determining whether decoding is successful for each inner code block may be used. This was motivated in that, compared to the case of performing only inner coding, there are more options for correcting errors through retransmission by outer coding, the number and location of errors in the outer code parity and outer code information are identified using an inner code-CRC or an inner code syndrome and transmission of an outer parity has less overhead than transmission of an outer information.

Figure 30:
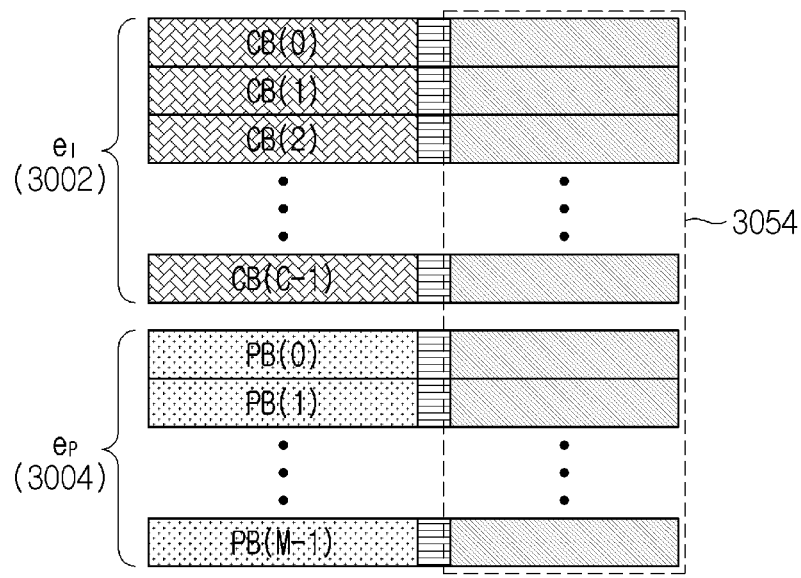
FIG. 30 is a diagram illustrating an example of error counting performed by a device applicable to the present disclosure.

FIG. 30 is a diagram illustrating an example of error counting performed by a device applicable to the present disclosure. FIG. 30 illustrates C+M inner code blocks including CB(0) to CB(C−1) and PB(0) to PB(M−1). The inner code blocks are decoded based on the parity bits 3054 generated by the inner code, and each of the decoded inner code blocks may be checked based on a CRC or syndrome. Errors obtained by check are obtained for each inner code block. For example, CB(1), CB(2), and PB(0) may be determined to be decoding failures. Determining CB(1), CB(2), and PB(0) to be decoding failure means that an error occurs in at least one of the bits included in CB(1), CB(2), and PB(0). However, since the location of an error cannot be specified in CB(1), CB(2), and PB(0), all bits have a possibility of having an error. Therefore, among the bits included in the outer code blocks, there is a possibility that errors exist in the second bit, third bit, and (C+1)-th bit corresponding to CB(1), CB(2), and PB(0).

From the perspective of the outer code block, errors are classified into errors occurring in an information part and errors occurring in a parity part. The number of errors estimated to occur in the information part is referred to as $e_I$ 3002, and the number of errors estimated to occur in the parity part is referred to as $e_P$ 3004. That is, $e_I$ 3002 and $e_P$ 3004 mean the number of potential errors in the outer code information part and the number of potential errors in the outer code parity part as the number of potential errors determined based on decoding failure of inner code blocks. Here, the estimation error may be referred to as 'estimated error', 'expected error', 'predicted error', 'assumed error' or other terms having an equivalent technical meaning. Also, an error bit estimated to occur in the information part may be referred to as an 'information error bit', an error bit estimated to occur in the parity part may be referred to as a 'parity error bit', or another term having equivalent technical meaning.

Based on $e_I$ 3002 and $e_P$ 3004, a retransmission request target may vary. For example, if $e_I$ 3002 is 0, ACK may be fed back because there is no error. As another example, if $e_I$ 3002 is equal to or less than a length M of the parity part, NACK requesting retransmission of the parity part may be fed back. As another example, if $e_I$ 3002 is greater than the length M of the parity part, NACK requesting retransmission of the information part or retransmission of the information part and the parity part may be fed back. Specifically, if $e_I$ 3002 is greater than the length M of the parity part and $e_P$ 3004 is 0, only retransmission of the information part may be requested. In the case of the outer code parity, efficient transmission may be performed by adjusting the size of the outer code parity, that is, the outer code code-rate.

Figure 31:
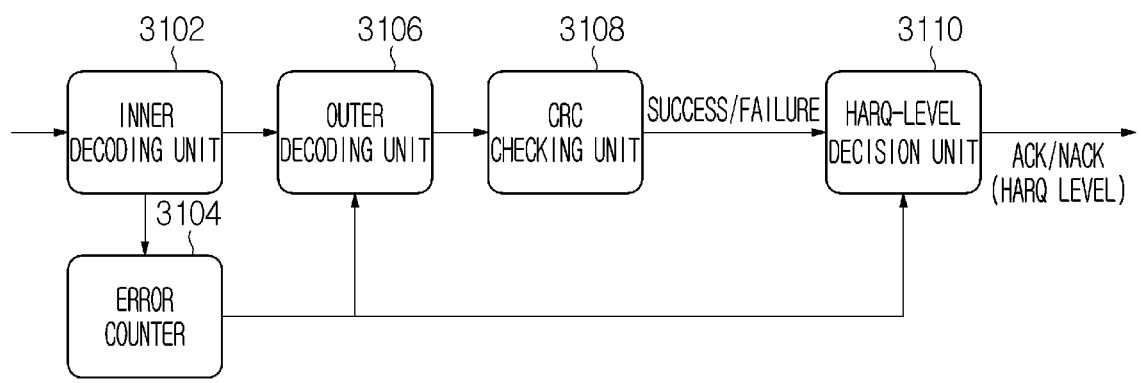
FIG. 31 is a diagram illustrating a structure of a receiver applicable to the present disclosure.

FIG. 31 is a diagram illustrating a structure of a receiver applicable to the present disclosure.

Referring to FIG. 31, the receiver may include an inner decoding unit 3102, an error counter 3104, an outer decoding unit 3106, a CRC checking unit 3108, and a HARQ-level decision unit 3110.

The inner decoding unit 3102 performs decoding based on an inner code. The inner decoding unit 3102 reconstructs an inner code block before parity generation by performing inner decoding. For example, the inner decoding unit 3102 may perform inner decoding based on an LDPC code.

The error counter 3104 determines whether inner decoding is successful. That is, the error counter 3104 determines whether there is an error in the inner code block obtained through inner decoding. For example, the error counter 3104 may determine success or failure of decoding through a CRC check or a syndrome check. If decoding of at least one inner code block fails, the error counter 3104 determines the number of potential errors in the outer code block. The number of errors includes the number of errors in the information part and the number of errors in the parity part.

The outer decoding unit 3106 performs decoding based on an outer code. The outer decoding unit 3106 reconstructs outer code blocks before parity generation by performing outer decoding. For example, the outer decoding unit 3106 may perform inner decoding based on a RS code. For example, the outer decoding unit 3106 may perform erasure decoding based on the location and number of at least one error identified by the error counter 3104.

The CRC checking unit 3108 determines whether outer decoding is successful. That is, the CRC checking unit 3108 determines whether there is an error in the information part of the outer code block obtained through outer decoding. For example, the CRC checking unit 3108 may determine success or failure of decoding through a CRC check or syndrome check.

The HARQ-level decision unit 3110 decides the content of ACK/NACK feedback. Specifically, the HARQ-level decision unit 3110 determines which of ACK or NACK is fed back based on whether decoding is successful or not determined by the CRC checking unit 3108. In addition, when feeding back NACK, the HARQ-level decision unit 3110 determines a target of retransmission. The target of retransmission may include at least one of an information part or a parity part.

Figure 32:
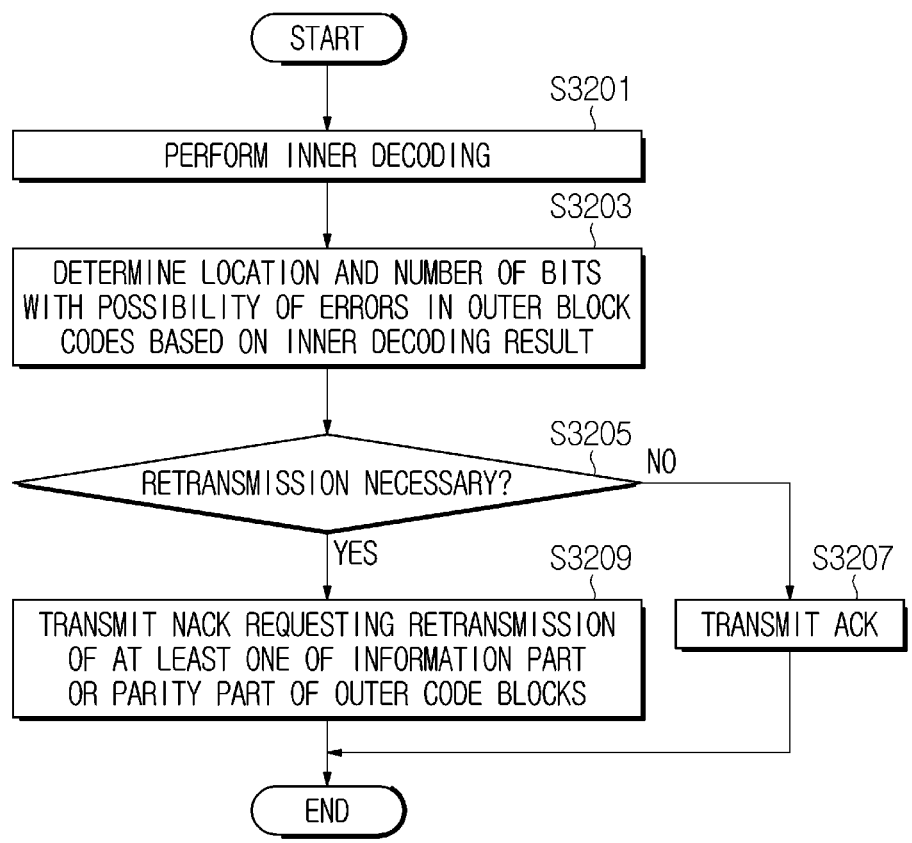
FIG. 32 is a diagram illustrating an embodiment of a procedure for requesting retransmission of data in a device applicable to the present disclosure.

FIG. 32 is a diagram illustrating an embodiment of a procedure for requesting retransmission of data in a device applicable to the present disclosure. FIG. 32 illustrates a method by performed a device including a receiver corresponding to a transmitter (e.g., the transmitter of FIG. 24). In the following description, the operating subject of FIG. 32 is referred to as a 'device', but may be referred to as a reception end, a reception device, a receiver, or other terms having equivalent technical meaning.

Referring to FIG. 32, in step S3201, the device performs inner decoding. That is, the device decodes the encoded inner code blocks based on an inner code. For example, the device may perform inner decoding based on an LDPC code.

In step S3203, the device determines the location and number of bits with a possibility of errors in the outer block codes based on the inner decoding result. Specifically, the device determines whether there is an error in the inner code block obtained through inner decoding through a CRC check or a syndrome check. Upon determining that decoding is successful for all inner code blocks included in one outer code-block group, the number of bits having the possibility of error may be determined to be 0. Upon determining that decoding has failed for at least one of the inner code blocks included in one outer code-block group, the device may determine the number and location of potential errors. The number of errors includes the number of errors in the information part and the number of errors in the parity part.

In step S3205, the device determines whether retransmission is necessary. Whether retransmission is necessary may be determined based on the number and location of potential errors. For example, if errors are estimated within the limit of the error correction capability of the erasure code for the outer code blocks (e.g., occurrence of errors less than or equal to the parity size), the device may determine that retransmission is not necessary.

If retransmission is not necessary, in step S3207, the device transmits ACK. That is, the device may inform a counterpart device that retransmission is not necessary by transmitting ACK. Although not shown in FIG. 32, the device may then perform outer decoding.

On the other hand, if retransmission is necessary, in step S3209, the device transmits NACK requesting retransmission of at least one of the information part or the parity part of the outer code blocks. That is, by transmitting NACK, the device notifies that retransmission is necessary as well as a part requiring retransmission. According to various embodiments, feedback indicating that retransmission is necessary and information indicating a part requiring retransmission may be transmitted through one signal or through two or more signals. The part requiring retransmission includes at least one of an information part and a parity part of outer code blocks, and is determined based on the number and location of potential errors. Rules for determining the part requiring retransmission according to the location and number of errors may be differently defined according to various embodiments.

Figure 33:
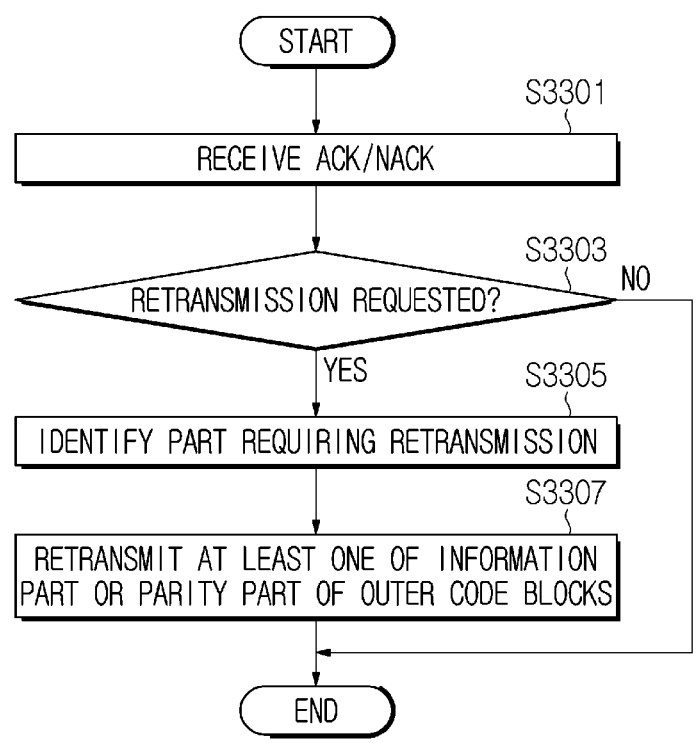
FIG. 33 is a diagram illustrating an embodiment of a procedure for retransmitting data in a device applicable to the present disclosure.

FIG. 33 is a diagram illustrating an embodiment of a procedure for retransmitting data in a device applicable to the present disclosure. FIG. 33 illustrates a method by performed a device including a transmitter (e.g., the transmitter of FIG. 24). In the following description, the operating subject of FIG. 33 is referred to as a 'device', but may be referred to as a transmission end, a transmission device, a transmitter, or other terms having equivalent technical meaning.

Referring to FIG. 33, in step S3301, the device receives ACK/NACK. In other words, the device receives HARQ feedback information including ACK or NACK. According to various embodiments, HARQ feedback information including NACK may include information indicating a part requiring retransmission. Alternatively, according to another embodiment, the device may further receive information indicating a part requiring retransmission separately from NACK.

In step S3303, the device determines whether retransmission is requested. In other words, the device checks whether NACK has been received. If retransmission is not requested, the device terminates this procedure.

On the other hand, if retransmission is requested, in step S3305, the device identifies a part requiring retransmission. The part requiring retransmission may include at least one of an information part of the outer code or a parity part of the outer code. The part requiring retransmission may be checked through a NACK signal or a separate signal.

In step S3307, the device retransmits at least one of an information part or a parity part of the outer code blocks. The device retransmits the part requested by a counterpart device. When retransmitting the parity part, the device may apply a different coding rate based on feedback information.

As described above, the reception device may change the target of retransmission according to the number and location of potential errors determined based on the result of inner decoding. At this time, a rule for determining a target of retransmission, that is, a HARQ level, may be defined in various ways. Hereinafter, specific embodiments for determining the HARQ level will be described.

Figure 34:
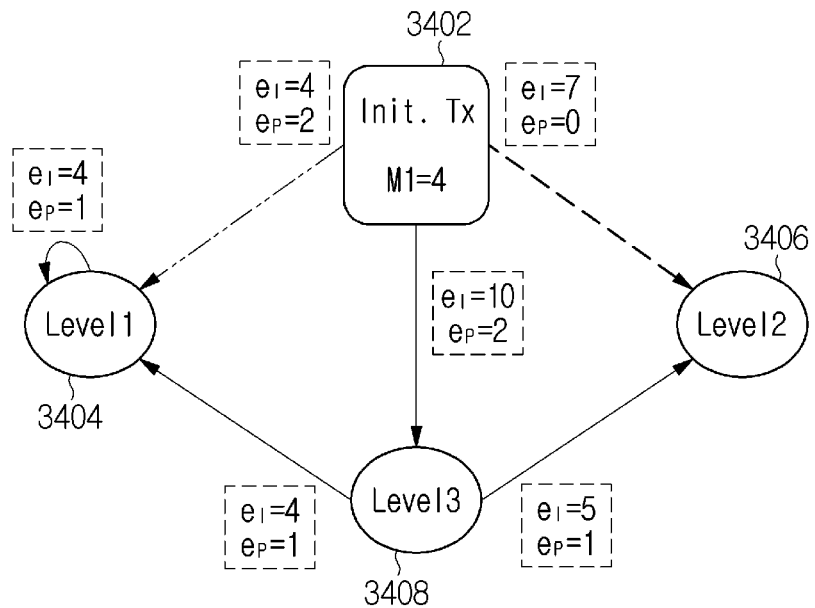
FIG. 34 is a diagram illustrating an example of a hybrid automatic repeat and request (HARQ) level in a system applicable to the present disclosure.

FIG. 34 is a diagram illustrating an example of a HARQ level in a system applicable to the present disclosure. FIG. 34 illustrates an example of HARQ level definition and level selection according to the number and location of errors, as a case where a parity by outer coding is transmitted together during initial transmission. Definition of the HARQ level applied in the example of FIG. 34 is shown in Table 6 below.

TABLE 6

| Level | Condition | Target of retransmission |
|---|---|---|
| ACK | No error | No retransmission |
| NACK-Level 1 | $0 < e_I \le M1$ | Outer code parity part |
| NACK-Level 2 | $M1 < e_I$ or $M1 < e_I$ & $e_P = 0$ | Outer code parity part |
| NACK-Level 3 | $M1 < e_I$ & $e_P \ne 0$ | Outer code information part & parity part |

M1 denotes the length of parity. When M1 is 4, level selection may be made as shown in FIG. 34. In the example of FIG. 34, since both the information part and the parity part are transmitted in the initial transmission 3402, both $e_I$ and $e_P$ for the initial transmission 3402 may be counted.

As a result of decoding the initial transmission 3402, if $e_I=4$ and $e_P=2$, since the total number of errors is greater than M1, retransmission is required, and if two errors in the parity part are corrected, the number of errors is reduced within the correction capability range of erasure coding, the HARQ level is determined to be level 1 3404. Accordingly, retransmission of the outer code parity part is requested. If the outer code parity part retransmitted according to level 1 3404 is combined, but all errors in the parity part are not corrected and if $e_I=4$ and $e_P=1$, the HARQ level is selected as level 1 3404 again.

As a result of decoding the initial transmission 3402, if $e_I=7$ and $e_P=0$, since the total number of errors is greater than M1, retransmission is required, and since errors exist only in the information part, the HARQ level is determined to be level 2 3406. Accordingly, retransmission of the information part of the outer code is requested.

As a result of decoding the initial transmission 3402, if $e_I=10$ and $e_P=2$, since the total number of errors is greater than M1, retransmission is required, and even if two errors in the parity part are corrected, the number of errors is not reduced within the correction capability range of erasure coding, the HARQ level is determined to be level 3 3408. Accordingly, retransmission of the information part and parity part of the outer code is requested.

As a result of combining the information part and parity part of the outer code retransmitted according to level 3 3408, if $e_I=4$ and $e_P=1$, if one error in the parity part is corrected, the number of errors is reduced within the correction capability range of erasure coding and thus the HARQ level is changed from level 3 3408 to level 1 3404.

As a result of combining the information part and parity part of the outer code retransmitted according to level 3 3408, if $e_I=5$ and $e_P=1$, if one error in the parity part is corrected, the number of errors is not reduced within the correction capability range of erasure coding. However, if two or more of the five errors of the information part are corrected, the number of errors is reduced within the correction capability range of erasure coding and thus the HARQ level is changed from level 3 3408 to level 2 3404.

Figure 35:
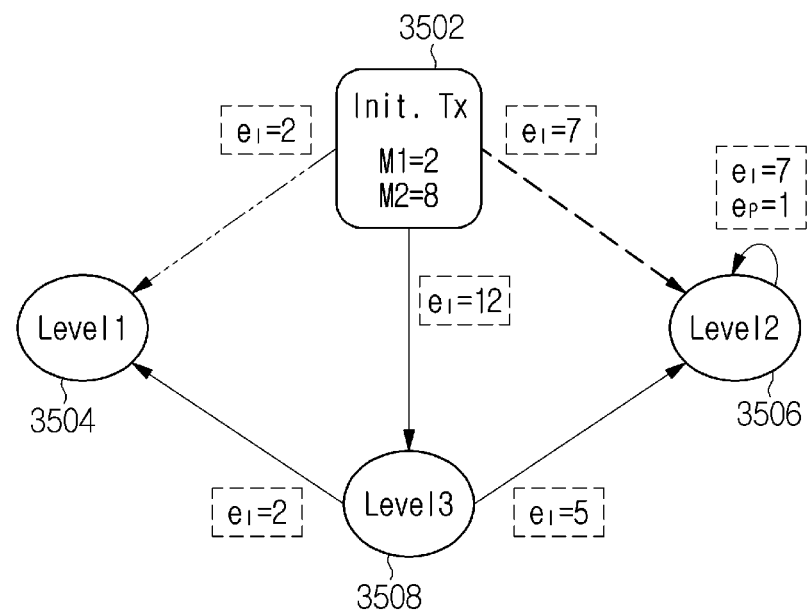
FIG. 35 is a diagram illustrating another example of an HARQ level in a system applicable to the present disclosure.

FIG. 35 is a diagram illustrating another example of an HARQ level in a system applicable to the present disclosure. FIG. 35 illustrates an example of HARQ level definition and level selection according to the number and location of errors, as a case where parity by outer coding is not transmitted together during initial transmission. Definition of the HARQ level applied to the example of FIG. 35 is shown in Table 7 below.

TABLE 7

| Level | Condition | Target of retransmission |
|---|---|---|
| ACK | No error | No retransmission |
| NACK-Level 1 | $0 < e_I \le M1$ | Outer code M1 parity part |
| NACK-Level 2 | $M1 < e_I \le M2$ | Outer code M2 parity part |
| NACK-Level 3 | $M2 < e_I$ | Outer code information part |

M1 and M2 denote lengths of parities according to different coding rates. When M1 is 2 and M2 is 8, level selection may be made as shown in FIG. 35. In the example of FIG. 35, since only the information part is transmitted in initial transmission 3502, only $e_I$ for the initial transmission may be counted.

As a result of decoding the initial transmission 3502, if $e_I=2$, an error occurs and retransmission is required, and since the number of errors is within the correction capability range of erasure coding using parity of length M1, the HARQ level is determined to be level 1 3504. Accordingly, retransmission of the outer code parity part of length M1 is requested.

As a result of decoding the initial transmission 3502, if $e_I=7$, an error occurs and retransmission is required, and since the number of errors is within the correction capability range of erasure coding using parity of length M2, the HARQ level is determined to be level 2 3506. Accordingly, retransmission of the outer code parity part of length M2 is requested.

As a result of combining the outer code parity parts of length M2 retransmitted according to level 2 3506, if $e_I=7$ and $e_P=1$, the total number of errors is greater than M2 and thus retransmission is required, and if one error of the parity part is corrected, the number of errors is not reduced within the correction capability range of erasure coding and thus the HARQ level is determined to be level 2 3506 again. Accordingly, retransmission of the outer code parity part of length M2 is requested.

As a result of decoding the initial transmission 3502, if $e_I=12$, an error occurs and retransmission is required, and since the number of errors is outside the correction capability range of erasure coding using parity of length M2, the HARQ level is determined to be level 3 3508. Accordingly, retransmission of the outer code information part of length is requested.

As a result of combining the outer code information parts retransmitted according to level 3 3508, if $e_I=2$, an error occurs and retransmission is required, and since the number of errors is within the correction capability range of erasure coding using parity of length M1, the HARQ level is changed from level 3 3508 to level 1 3504. Accordingly, retransmission of the outer code parity part of length M1 is requested.

As a result of combining the outer code information parts retransmitted according to level 3 3508, if $e_I=5$, an error occurs and retransmission is required, and since the number of errors is within the correction capability range of erasure coding using parity of length M2, the HARQ level is changed from level 3 3508 to level 2 3506. Accordingly, retransmission of the outer code parity part of length M2 is requested.

As in the above-described embodiments, a target of retransmission may vary according to a decoding result. Accordingly, various combinations of initial transmission and retransmission may be made. For various combinations of initial transmission and retransmission, combining or concatenating of signals is performed as shown in FIG. 36 below.

Figure 36:
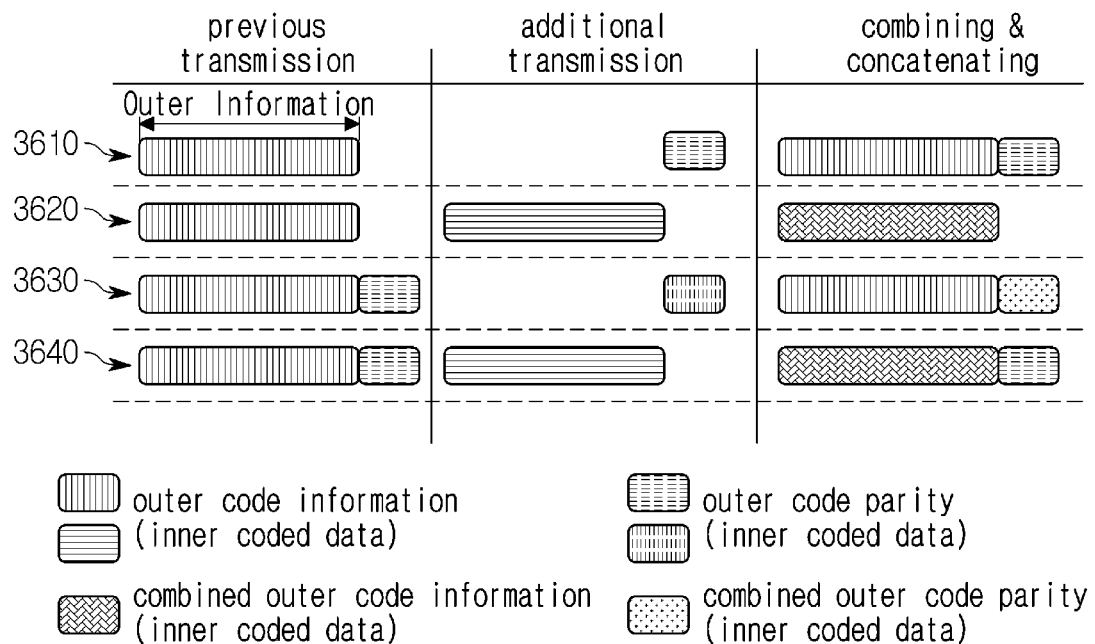
FIG. 36 is a diagram illustrating an example of combining initial transmission and retransmission in a system applicable to the present disclosure.

FIG. 36 is a diagram illustrating an example of combining initial transmission and retransmission in a system applicable to the present disclosure. FIG. 36 illustrates how previous transmission and additional transmission are combined. Referring to FIG. 36, when previous transmission and additional transmission overlap (e.g., the second case 3620, the third case 3630, and the fourth case 3640), combining is performed. When the previous transmission and the additional transmission do not overlap (e.g., the first case 3610), concatenating is performed.

According to the above-described embodiments, NACK information is transmitted together with HARQ level information. If only ACK/NACK is indicated, HARQ feedback may be represented by 1 bit. However, if HARQ-level signaling is added, at least 1 bit shall be added, and HARQ feedback requires at least 2 bits. In order to express ACK/NACK and HARQ levels using at least 2 bits of information, HARQ level configuration are required. According to an embodiment, a procedure for providing information on HARQ level configuration is shown in FIG. 37 below.

Figure 37:
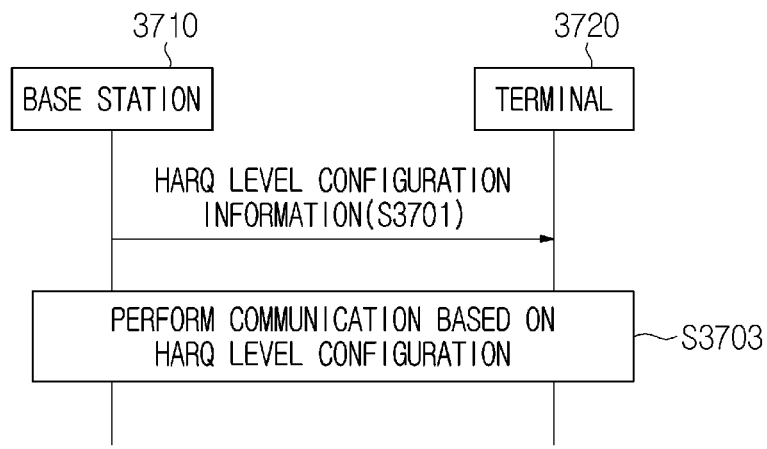
FIG. 37 is a diagram illustrating an embodiment of a procedure for providing a configuration related to an HARQ level in a system applicable to the present disclosure.

FIG. 37 is a diagram illustrating an embodiment of a procedure for providing a configuration related to an HARQ level in a system applicable to the present disclosure. FIG. 37 illustrates signal exchange between a base station 3710 and a terminal 3720.

Referring to FIG. 37, in step S3701, the base station 3710 transmits configuration information related to the HARQ level to the terminal 3720. Configuration information related to the HARQ level may be transmitted or broadcast to the terminal 3720 by dedicated signaling. For example, configuration information related to the HARQ level may be transmitted by RRC signaling or may be transmitted as system information. The configuration information related to the HARQ level may include information related to definition of the HARQ level and information for feedback of the HARQ level. For example, information related to definition of the HARQ level includes at least one of definition of the HARQ level (e.g., level number corresponding to location and number of potential errors), a target requiring retransmission for each HARQ level (e.g., information part, parity part, information+parity part) or a value for determining the HARQ level (e.g., parity size, coding rate). Information for feeding back the HARQ level may include at least one of whether the HARQ level and ACK/NACK are fed back as one signal, constellation mapping information of a signal representing the HARQ level and ACK/NACK, or information for allocating resources for separately indicating the HARQ level.

In step S3703, the base station 3710 and the terminal 3720 perform communication based on configuration information related to the HARQ level. In the case of downlink, the base station 3710 transmits transmission data generated through at least one of outer encoding or inner encoding, and then the terminal 3720 performs at least one of inner decoding or outer decoding on received data, determines whether there is an error, and feeds back ACK/NACK and HARQ level based on the configuration information related to the HARQ level. In the case of uplink, after the terminal 3720 transmits transmission data generated through at least one of outer encoding or inner encoding, the base station 3710 performs at least one of inner decoding or outer decoding on the received data, determines an error, and feeds back ACK/NACK and HARQ levels based on configuration information related to the HARQ level.

In the embodiment described with reference to FIG. 37, the base station provides configuration information related to the HARQ level to the terminal, and the base station and the terminal perform communication based on the configuration information related to the HARQ level. Here, communication may be downlink communication or uplink communication. However, according to another embodiment, configuration information related to the HARQ level may be used for sidelink communication. That is, based on configuration information related to the HARQ level provided from the base station, the terminal and another terminal may perform communication.

As in the embodiment described with reference to FIG. 37, the configuration information related to the HARQ level may be provided. Here, the configuration information related to the HARQ level may be expressed in various formats. Examples of the format of the configuration information related to the HARQ level are as follows.

According to an embodiment, a method of defining a table in advance and signaling an HARQ level based on the table may be used. At this time, a plurality of options may be defined, and an applied option may be indicated through signaling. Table 8 below shows an example of a table for ACK/NACK.

TABLE 8

| HARQ level | Option 1 | Option 2 | default |
|---|---|---|---|
| ACK | — | — | — |
| NACK-Level 1 | Outer parity (M1) | Outer parity (M1) | Outer parity (M1) |
| NACK-Level 2 | Outer information | Outer parity (M2) | Outer information |
| NACK-Level 3 | Outer information and parity | Outer information | Outer information and parity |

As in the example of Table 8, when option 1 and option 2 are defined, the base station or the terminal may indicate the option to be used through signaling. Here, the option may be determined and signaled by the transmission side or the reception side. In addition to signaling for the option, an outer code parity mode, an outer parity size, or an outer code coding rate may be dynamically specified. That is, the values of M1 and M2 may be variably determined according to circumstances. Similar to the determination of options, the values of M1 and M2 may be determined and signaled by the transmission side or the reception side. In the example of Table 8, a plurality of options are included in one table, but it may be understood that a plurality of tables is present and each table includes each option of FIG. 8.

According to another embodiment, unlike defining a plurality of options, definition of HARQ levels may be signaled. For example, a retransmission request target corresponding to each HARQ level 1/2/3 may be dynamically configured. For example, the HARQ level may be configured depending on the scenario and indicated through higher layer (e.g., RRC) signaling. Higher layer signaling specifies at least one of the HARQ levels included in a list of possible HARQ levels. For example, the list may include at least one of outer parity of length M1, outer parity of length M2, outer information, or outer information+outer parity. In the list listed above, at least one supported HARQ level may be selectively configured.

When the HARQ level is configured as described above, ACK/NACK may be transmitted according to various methods. According to an embodiment, the reception device may transmit 1-bit information for ACK/NACK, and may further transmit control information (e.g., UCI in the case of uplink) for indicating the HARQ level in case of NACK. This method may be applied in a DTX situation. According to another embodiment, the reception device may transmit 2-bit information representing both ACK/NACK and HARQ level. In this case, 2-bit information may be expressed as QPSK symbols mapped to real/image domain.

According to various embodiments described above, an outer code parity may not be transmitted during initial transmission. In this case, the outer code parity may be transmitted for the first time during retransmission. A series of HARQ levels that may occur during initial transmission and retransmission are shown in FIG. 38 below.

Figure 38:
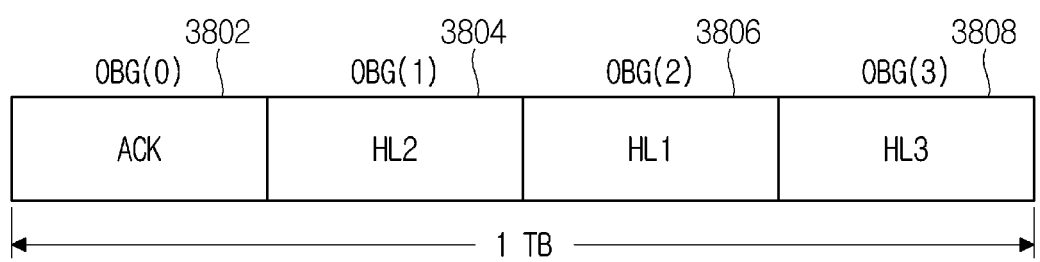
FIG. 38 is a diagram illustrating an example of an HARQ level for each outer code-block group in a system applicable to the present disclosure.

FIG. 38 is a diagram illustrating an example of an HARQ level for each outer code-block group in a system applicable to the present disclosure. FIG. 38 illustrates a series of outer code-block groups. Referring to FIG. 38, the HARQ level for OBG(0) 3802 is determined to be ACK, the HARQ level for OBG(1) 3804 is determined to be level 2, the HARQ level for OBG(2) 3806 is determined to be level 1, and the HARQ level for OBG(3) 3808 is determined to be level 3. If the HARQ level definition shown in FIG. 35 is applied, during retransmission for OBG(1) 3804, OBG(2) 3806, and OBG(3) 3808, outer code parity will be transmitted for the first time.

In general, according to the HARQ process, redundancy (RV) at the time of initial transmission is RV0. However, due to the HARQ level, the best RV between outer code information and outer code parity may vary. Specifically, as in the above situation, when the outer code parity is not included in the initial transmission and is transmitted for the first time duration retransmission, the RV between the outer code information and the outer code parity may vary. Although the outer code information is initially transmitted through RV0, the outer code parity is not included in the initial transmission. Therefore, in order to obtain the best performance, the outer code parity included in the first retransmission shall be transmitted through RV0.

However, since the HARQ level of OBG (1) 3804 is level 2 and the HARQ level of OBG (2) 3806 is level 1, outer code parity is transmitted during the first retransmission. On the other hand, since the HARQ level of OBG (3) 3808 is level 3, outer code information is transmitted during the first retransmission. At this time, according to the aforementioned RV application principle, during the first retransmission, the RV applied to OBG(1) 3804 and OBG(2) 3806 is RV0, and the RV applied to OBG(3) 3808 is RV1. That is, during retransmission, the RV applied for each outer code-block group may vary.

In order to independently apply RV for each outer code-block group, the system may manage and signal RV for each outer code-block group. However, in this case, since RV information may act as large overhead, an alternative to prevent this is required. In order to solve this problem, the present disclosure presents the following two embodiments.

According to one embodiment, during initial transmission, the device transmits outer code parity as well as outer code information. In this case, since RV0 is applied to both outer code information and outer code parity, even if the HARQ level for retransmission is different for each outer code-block group, there is little performance degradation. In this case, it may be signaled as a single RV value without distinction between outer code information and outer code parity.

According to an embodiment, when only outer code information is transmitted and outer code parity is not transmitted during initial transmission, outer code parity is always transmitted for all HARQ levels during retransmission. In this case, outer code information is always included in initial transmission, and outer code parity is always included in retransmission. In this case, the RV of outer code information and the RV of outer code parity may be signaled respectively without distinguishing outer code-block groups.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL AVAILABILITY

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

The invention claimed is:

1. A method by performed a first device in a wireless communication system, the method comprising:
receiving a first signal comprising coded data from a second device;
performing decoding on the coded data including block groups, each of the block groups includes code blocks;
identifying a location and number of at least one code block where decoding has failed;
determining whether to request retransmission based on the location and number of the at least one code block; and
requesting, to the second device, retransmission of at least one of the block groups based on the location and number of the at least one code block,
wherein each of the block groups comprises an outer code block that corresponds to a set of code blocks including information bit-based first type inner code blocks and parity bit-based second type inner code blocks, and
wherein the retransmission is requested for retransmission of at least one of an information part or a parity part of the outer code block based on a location and number of at least one bit having a possibility of an error in the outer code block.

2. The method of claim 1, wherein the retransmission is requested based on the number of at least one bit exceeding a length of parity of the outer block codes.

3. The method of claim 1, wherein the at least one bit is classified into at least one information error bit detected in the information part and at least one parity error bit detected in the parity part.

4. The method of claim 3, wherein the requesting the retransmission comprises, requesting retransmission of the parity part, based on a number of the at least one parity error being greater than 0 and a number of the at least one parity error bit being less than or equal to a length of the parity part.

5. The method of claim 3, wherein the requesting the retransmission comprises, requesting retransmission of the information part based on a number of the at least one information error bit being greater than a length of the parity part.

6. The method of claim 3, wherein the requesting the retransmission comprises, requesting retransmission of the parity part based on a number of the at least one parity error bit being greater than 0 and a number of the at least one information error bit being greater than a length of the parity part.

7. The method of claim 1, wherein the first signal does not include the parity part, and
wherein the at least one bit comprises at least one information error bit included in the information part.

8. The method of claim 7, wherein the requesting the retransmission comprises, requesting retransmission of a parity part having a length of a first candidate value, based on a number of the at least one information error bit being less than or equal to the first candidate value for a length of the parity part.

9. The method of claim 7, wherein the requesting the retransmission requesting retransmission of a parity part having a length of a second candidate value, based on a number of the at least one information error bit being greater than a first candidate value for a length of the parity part and being less than or equal to a second candidate value.

10. The method of claim 7, wherein the requesting the retransmission comprises, requesting retransmission of the parity part, based on a number of the at least one information error bits being greater than a first candidate value for a length of the parity part and being greater than a second candidate value.

11. The method of claim 1, further comprising:
receiving configuration information related to a retransmission request part corresponding to the location and number of at least one bit.

12. The method of claim 11, wherein the configuration information comprises at least one of definition of a hybrid automatic repeat and request (HARQ), a retransmission request target for each HARQ level, a value for determining a HARQ level, whether a HARQ level and ACK/NACK (acknowledgement/negative-ACK) are fed back as one signal, constellation mapping information of a signal representing the HARQ level and ACK/NACK or information for allocating resource for separately indicating the HARQ level.

13. The method of claim 11, further comprising:
receiving a second signal that is retransmitted;
generating a third signal by combining or concatenating the first signal and the second signal; and
performing decoding on data in the third signal,
wherein the outer decoding comprises erasure decoding.

14. A second device in a wireless communication system, the second device comprising:
a transceiver; and
a processor coupled to the transceiver and is configured to:
transmit, to a first device, a signal comprising coded data including block groups, each of the block groups includes code blocks; and
receive, from the first device, a feedback signal requesting retransmission of the block groups,
wherein each of the block groups comprises an outer code block that corresponds to a set of code blocks including information bit-based first type inner code blocks and parity bit-based second type inner code blocks, and
wherein the retransmission is requested for retransmission of at least one of an information part or a parity part of the outer code block based on a location and number of at least one bit having a possibility of an error in the outer code block.

15. A first device in a wireless communication system, the first device comprising:
a transceiver; and
a processor coupled to the transceiver and configured to:
receive a first signal comprising coded data from a second device;
perform decoding on the coded data including block groups, each of the block groups includes code blocks;
identify a location and number of at least one code block where decoding has failed;
determining whether to request retransmission based on the location and number of the at least one code block; and
request, to the second device, retransmission of at least one of the block groups based on the location and number of the at least one code block,
wherein each of the block groups comprises an outer code block that corresponds to a set of code blocks including information bit-based first type inner code blocks and parity bit-based second type inner code blocks, and
wherein the retransmission is requested for retransmission of at least one of an information part or a parity part of the outer code block based on a location and number of at least one bit having a possibility of an error in the outer code block.

16. The first device of claim 15, wherein the retransmission is requested based on the number of at least one bit exceeding a length of parity of the outer block codes.

17. The first device of claim 16, wherein the at least one bit is classified into at least one information error bit detected in the information part and at least one parity error bit detected in the parity part.

18. The first device of claim 16, wherein the first signal does not include the parity part, and
wherein the at least one bit comprises at least one information error bit included in the information part.

19. The first device of claim 16, wherein the processor is further configured to:
receive configuration information related to a retransmission request part corresponding to the location and number of at least one bit.

20. The first device of claim 19, wherein the configuration information comprises at least one of definition of a hybrid automatic repeat and request (HARQ), a retransmission request target for each HARQ level, a value for determining a HARQ level, whether a HARQ level and ACK/NACK (acknowledgement/negative-ACK) are fed back as one signal, constellation mapping information of a signal representing the HARQ level and ACK/NACK or information for allocating resource for separately indicating the HARQ level.

* * * * *